(12) United States Patent
Viel et al.

(10) Patent No.: US 10,180,970 B2
(45) Date of Patent: *Jan. 15, 2019

(54) DATA PROCESSING METHOD AND DATA PROCESSING APPARATUS

(71) Applicant: FUJITSU LIMITED, Kawasaki-shi, Kanagawa (JP)

(72) Inventors: Emeric Viel, Yokohama (JP); Haruyasu Ueda, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 246 days.

This patent is subject to a terminal disclaimer.

(21) Appl. No.: 14/859,453

(22) Filed: Sep. 21, 2015

(65) Prior Publication Data

US 2016/0092517 A1 Mar. 31, 2016

(30) Foreign Application Priority Data

Sep. 25, 2014 (JP) ................................ 2014-195367

(51) Int. Cl.
*G06F 17/30* (2006.01)

(52) U.S. Cl.
CPC .. *G06F 17/30545* (2013.01); *G06F 17/30516* (2013.01)

(58) Field of Classification Search
CPC ..................... G06F 17/30516; G06F 17/30545
See application file for complete search history.

(56) References Cited

U.S. PATENT DOCUMENTS

| 5,727,197 A | 3/1998 | Burgess et al. |
|---|---|---|
| 7,663,671 B2 | 2/2010 | Gallagher et al. |
| 7,743,044 B1 * | 6/2010 | Kalogeraki ....... G06F 17/30106 707/706 |
| 2008/0028095 A1 * | 1/2008 | Lang ................. G06F 17/30516 709/232 |

(Continued)

FOREIGN PATENT DOCUMENTS

| JP | 09-212528 | 8/1997 |
|---|---|---|
| JP | 2009-518704 | 5/2009 |

(Continued)

OTHER PUBLICATIONS

John Hershberger et al., "Adaptive Spatial Partitioning for Multi-dimensional Data Streams", pp. 522-533, Springer-Verlag Berlin Heidelberg 2004 (12 pages).

(Continued)

*Primary Examiner* — Shiow-Jy Fan
(74) *Attorney, Agent, or Firm* — Fujitsu Patent Center

(57) ABSTRACT

A data processing method is executed by a computer to perform distributed processing of a first query and a second query. The data processing method includes calculating a first value indicating a dependency between a first partitioning key and a second partitioning key, the first partitioning key specifying a categorical attribute extracted from syntax of the first query, and the second partitioning key specifying a numerical attribute holding numerical values associated with the second query; generating a query group made of the first query and the second query based on the first value; and (Continued)

performing distributed processing of the first query and the second query based on the query group when executing the first query and the second query.

3 Claims, 39 Drawing Sheets

(56) References Cited

U.S. PATENT DOCUMENTS

| | | | |
|---|---|---|---|
| 2008/0162409 A1* | 7/2008 | Meijer | G06F 17/30445 |
| 2009/0132503 A1* | 5/2009 | Sun | G06F 17/30427 |
| 2009/0319687 A1* | 12/2009 | Goldstein | G06F 9/5083 |
| | | | 709/241 |
| 2010/0030741 A1 | 2/2010 | Johnson et al. | |
| 2010/0114870 A1* | 5/2010 | Al-Omari | G06F 17/30445 |
| | | | 707/718 |
| 2010/0318516 A1 | 12/2010 | Kolen et al. | |
| 2011/0029554 A1 | 2/2011 | Ito et al. | |
| 2011/0040746 A1 | 2/2011 | Handa et al. | |
| 2011/0040827 A1* | 2/2011 | Katsunuma | G06F 17/30516 |
| | | | 709/203 |
| 2011/0131198 A1* | 6/2011 | Johnson | G06F 17/30498 |
| | | | 707/714 |
| 2011/0145828 A1* | 6/2011 | Takahashi | H04L 67/1029 |
| | | | 718/102 |
| 2014/0372438 A1* | 12/2014 | Chandramouli | G06F 17/30598 |
| | | | 707/737 |

FOREIGN PATENT DOCUMENTS

| | | |
|---|---|---|
| JP | 2011-34255 A | 2/2011 |
| JP | 2011-34256 A | 2/2011 |
| JP | 2011-39818 A | 2/2011 |
| JP | 2011-76153 A | 4/2011 |
| JP | 4925143 B2 | 4/2012 |
| JP | 2012-530289 | 11/2012 |
| WO | 2007/061728 | 5/2007 |
| WO | 2010/144692 | 12/2010 |

OTHER PUBLICATIONS

U.S. Office Action dated Jan. 24, 2018 for co-pending U.S. Appl. No. 14/943,454, 10 pages.
U.S. Final Office Action dated Aug. 13, 2018 for copending U.S. Appl. No. 14/943,454, 14 pages.
Arasu, Arvind et al., "CQL: A Language for Continuous Queries over Streams and Relations", Database Programming Languages, Springer-Verlag Berlin Heidelberg, pp. 1-19 (10 pages), Jan. 1, 2004.
Interstage, Fujitsu, "Interstage Big Data Complex Event Processing Servier V1.0.0". Developer's Reference; http://software.fujitsu.com/jp/manual/manualfiles/m120021/j2ul1668/01enz200/j2ul-1668-01enz0-00.pdf, 118 pages, Oct. 1, 2012.
Viel, Emerie et al., "Parallelism Extraction in Data Stream Programs", [online], Mar. 2, 2013, [retrieved on Jun. 14, 2013] Retrieved from: ebookbrowse, Internet <URL: http://ebookbrowse.com/parallelism-extraction-in-data-stream-programs-pdf-d457331724>, pp. 1-15 (16 pages).
Ivert, Annica et al., "Linear Programming Optimization of Query Allocation in a Distributed CEP System", Bachelor Thesis, Royal Institute of Technology, [online], 2012, [retrieved on Jun. 14, 2013] Retrieved from: KTH Publication Database DiVA, Internet <URL: http://kth.diva-portal.org/smash/get/diva2:552594/FULLTEXT01>, pp. 1-41 (46 pages).
International Search Report, mailed in connection with PCT/JP2013/063983 and dated Jun. 25, 2013 (1 page).

* cited by examiner

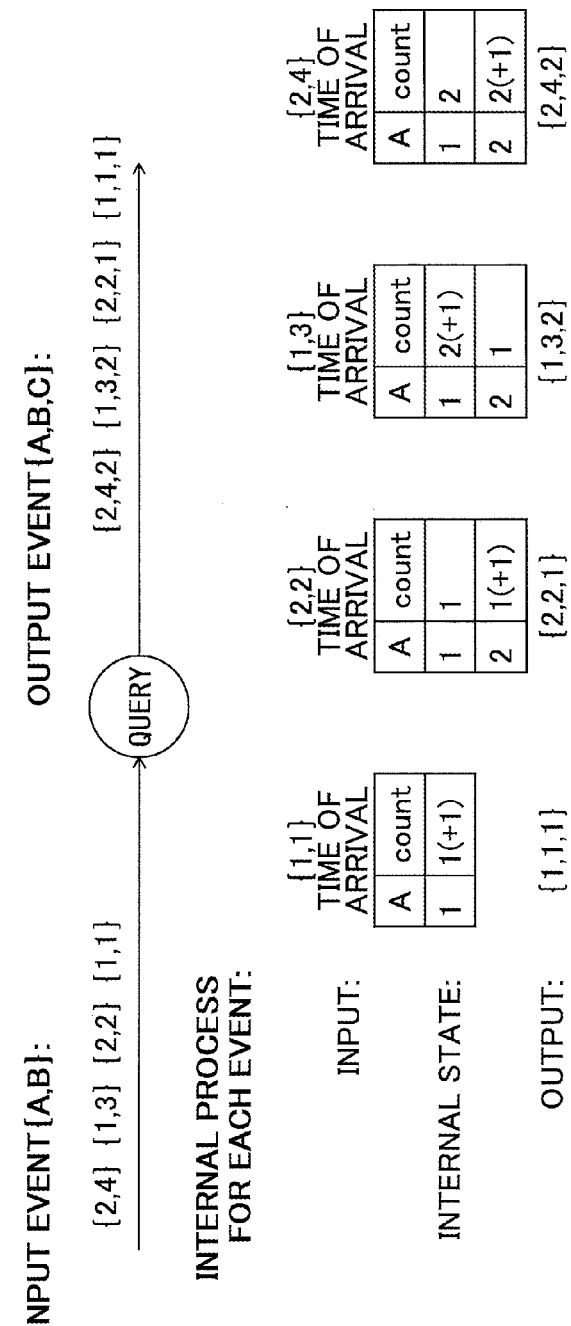

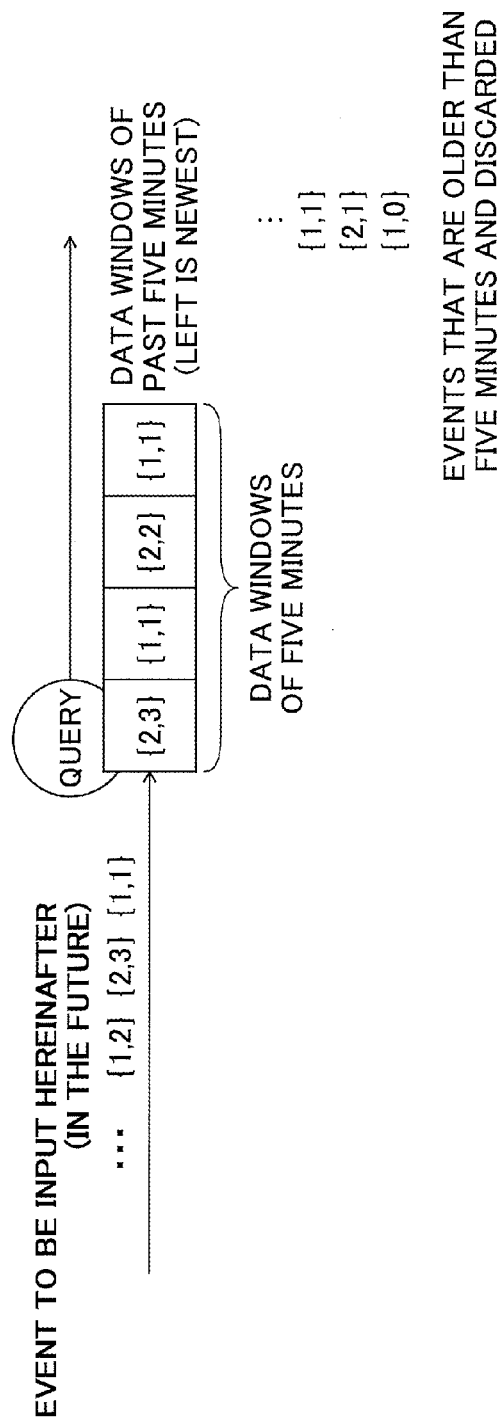

| SERVER LOAD | count | SERVER ID | PID |
|---|---|---|---|
| 50% | 5000 | 1 | 1 |
| 60% | 6000 | 2 | 2 |
| 50% | 5400 | 3 | 3 |
| 60% | 5600 | 4 | 4 |
| 75% | 5000 | 5 | 5 |

RANGE QUERY:
OBTAIN WHETHER THERE IS ACCIDENT
WITHIN 5 MINUTES WITHIN 4 MILES
IN MOVEMENT DIRECTION

```
select *
from LocationReport as v,
     Accidents.win:time(5 minutes) as a
where (a.x - v.x <= 5) && (v.x - a.x >= 0 );
```

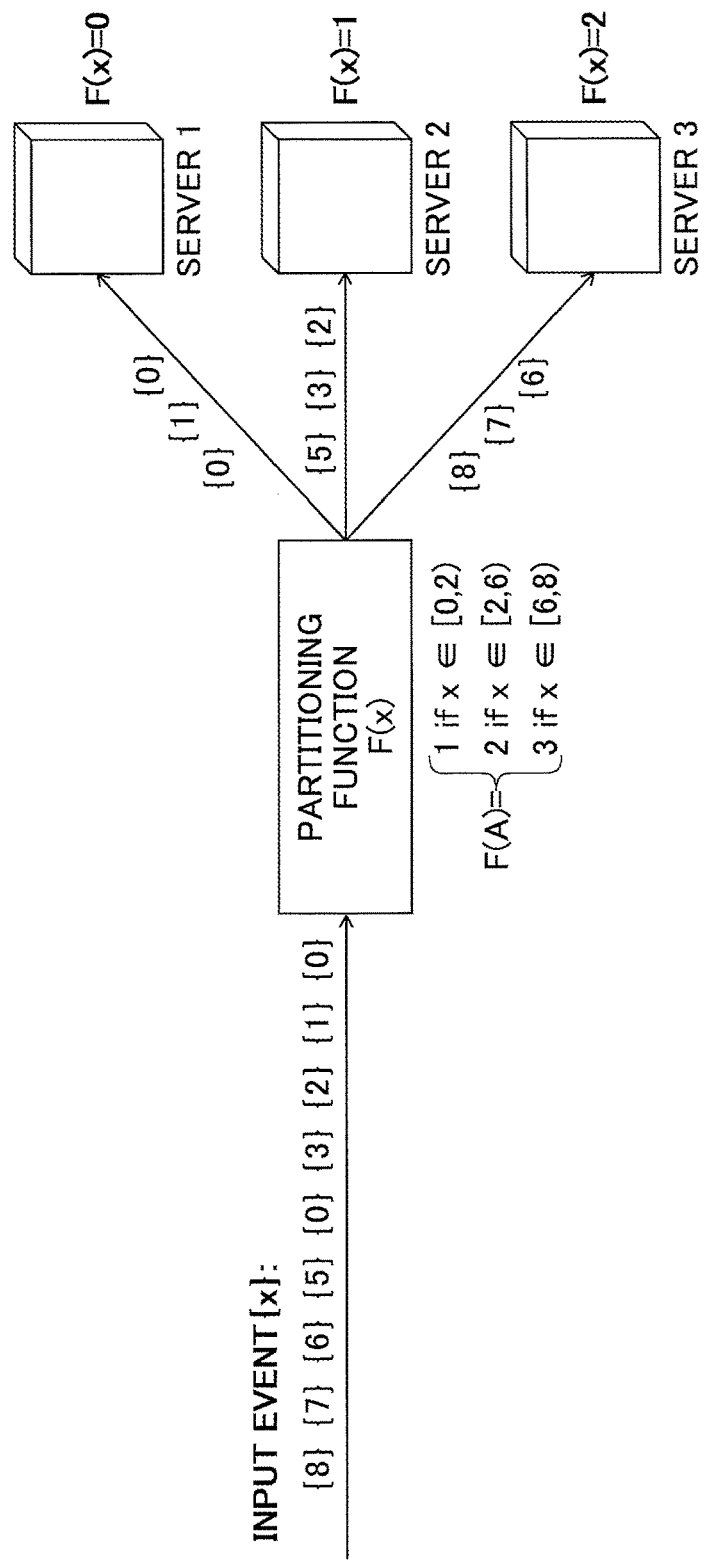

FIG.14A
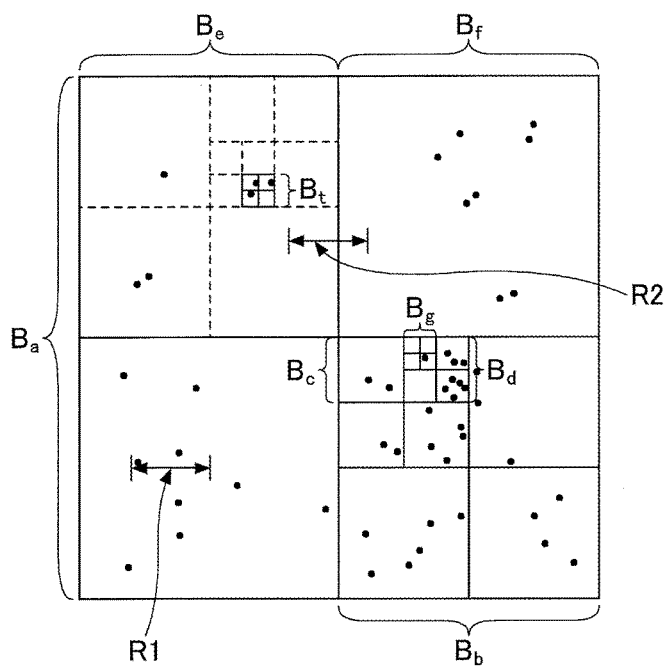
FIG.14B
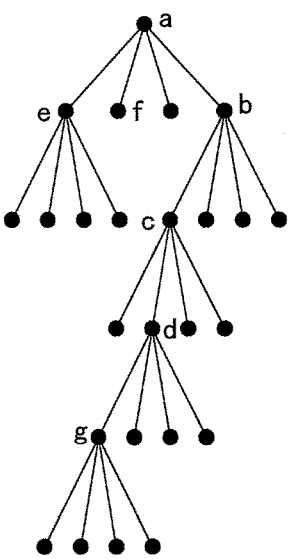
FIG.15
| SERVER LOAD | count | SERVER ID | PID | range start | range end |
|---|---|---|---|---|---|
| 50% | 5000 | 1 | 1 | 0 | 99 |
| 60% | 6000 | 2 | 2 | 100 | 199 |
| 50% | 5400 | 3 | 3 | 200 | 249 |
| 60% | 5600 | 4 | 4 | 250 | 299 |
| 75% | 5000 | 5 | 5 | 300 | 999 |

FIG.20

DATA WINDOW

| A | B | |
|---|---|---|
| 1 | 7 | ... |
| 2 | 6 | ... |
| 3 | 6 | ... |
| 1 | 6 | ... |
| 2 | 6 | ... |
| 3 | 6 | ... |
| 1 | 6 | ... |
| 2 | 6 | ... |
| 3 | 6 | ... |
| 1 | 6 | ... |
| 2 | 7 | ... |
| 3 | 7 | ... |

COUNT OCCURRENCE NUMBER FOR EACH COMBINATION OF A, B ⇒

COUNTER TABLE

| K1 | K2 | COMBINATION VALUE OF K1, K2 | OCCURRENCE NUMBER | COMBINATION STATE (K1→K2) | COMBINATION STATE (K1←K2) |
|---|---|---|---|---|---|
| A | B | {1,6} | 3 | REGULARITY | REGULARITY |
| A | B | {1,7} | 1 | EXCEPTION | REGULARITY |
| A | B | {2,6} | 3 | REGULARITY | EXCEPTION |
| A | B | {2,7} | 1 | EXCEPTION | EXCEPTION |
| A | B | {3,6} | 3 | REGULARITY | EXCEPTION |
| A | B | {3,7} | 1 | EXCEPTION | EXCEPTION |

ADDED UP ⇒

REGULARITY RATIO OF A→B:
(3*3)/12=9/12
EXCEPTION RATIO OF A→B:
(1*3)/12=3/12

ADDED UP ⇒

REGULARITY RATIO OF B→A:
(3*1+1*1)/12=4/12
EXCEPTION RATIO OF B→A:
(3*2+1*2)/12=8/12

| DATA WINDOW | |
|---|---|
| ID | X |
| 1 | 8 |
| 2 | 1 |
| 3 | 6 |
| 4 | 3 |
| 1 | 7 |
| 2 | 2 |
| 3 | 7 |
| 4 | 2 |
| 1 | 6 |
| 2 | 3 |
| 3 | 8 |
| 4 | 1 |
| ⋮ | ⋮ |

COUNT OCCURRENCE NUMBER FOR EACH COMBINATION OF ID, X ⇒

COUNTER TABLE

| K1 | K2 | COMBINATION VALUE OF K1, K2 | OCCURRENCE NUMBER | COMBINATION STATE (K1→K2) | COMBINATION STATE (K1←K2) |
|---|---|---|---|---|---|
| ID | X | {1,8} | 1 | REGULARITY | REGULARITY |
| ID | X | {1,7} | 1 | EXCEPTION | REGULARITY |
| ID | X | {1,6} | 1 | EXCEPTION | REGULARITY |
| ID | X | {2,1} | 1 | REGULARITY | REGULARITY |
| ID | X | {2,2} | 1 | EXCEPTION | REGULARITY |
| ID | X | {2,3} | 1 | EXCEPTION | REGULARITY |
| ID | X | {3,6} | 1 | REGULARITY | EXCEPTION |
| ID | X | {3,7} | 1 | EXCEPTION | EXCEPTION |
| ID | X | {3,8} | 1 | EXCEPTION | EXCEPTION |
| ID | X | {4,3} | 1 | REGULARITY | EXCEPTION |
| ID | X | {4,2} | 1 | EXCEPTION | EXCEPTION |
| ID | X | {4,1} | 1 | EXCEPTION | EXCEPTION |

ADDED UP ⇒ REGULARITY RATIO OF ID→X =4/12
EXCEPTION RATIO OF ID→X =8/12

ADDED UP ⇒ REGULARITY RATIO OF X→ID =6/12
EXCEPTION RATIO OF X→ID =6/12

| K1 | K2 | COMBINATION VALUE OF K1, K2 | OCCUR-RENCE NUMBER | COMBINATION STATE (K1→K2) | COMBINATION STATE (K1←K2) |
|---|---|---|---|---|---|
| ID | X | {1,8} | 1 | REGULARITY | REGULARITY |
| ID | X | {1,7} | 1 | EXCEPTION | REGULARITY |
| ID | X | {1,6} | 1 | EXCEPTION | REGULARITY |
| ID | X | {2,1} | 1 | REGULARITY | REGULARITY |
| ID | X | {2,2} | 1 | EXCEPTION | REGULARITY |
| ID | X | {2,3} | 1 | EXCEPTION | REGULARITY |
| ID | X | {3,6} | 1 | REGULARITY | EXCEPTION |
| ID | X | {3,7} | 1 | EXCEPTION | EXCEPTION |
| ID | X | {3,8} | 1 | EXCEPTION | EXCEPTION |
| ID | X | {4,3} | 1 | REGULARITY | EXCEPTION |
| ID | X | {4,2} | 1 | EXCEPTION | EXCEPTION |
| ID | X | {4,1} | 1 | EXCEPTION | EXCEPTION |
| ... | ... | ... | ... | ... | ... |
| A | X | {1,1} | 1 | REGULARITY | REGULARITY |
| A | X | {1,2} | 1 | EXCEPTION | EXCEPTION |
| ... | ... | ... | ... | ... | ... |
| B | X | {1,1} | 1 | REGULARITY | REGULARITY |
| B | X | {1,2} | 1 | EXCEPTION | EXCEPTION |
| ... | ... | ... | ... | ... | ... |

FIG.26B

| K1 | K2 | WHETHER TO APPLY PID TO K2 | COMBINATION VALUE OF K1, K2 | OCCUR-RENCE NUMBER | COMBINATION STATE (K1→K2) | COMBINATION STATE (K1←K2) |
|---|---|---|---|---|---|---|
| ID | X | 1 | {1,3} | 2 | REGULARITY | REGULARITY |
| ID | X | 1 | {1,2} | 1 | REGULARITY | REGULARITY |
| ID | X | 1 | {2,1} | 3 | REGULARITY | REGULARITY |
| ID | X | 1 | {3,2} | 1 | REGULARITY | EXCEPTION |
| ID | X | 1 | {3,3} | 2 | REGULARITY | EXCEPTION |
| ID | X | 1 | {4,1} | 3 | REGULARITY | EXCEPTION |
| ... | ... | ... | ... | ... | ... | ... |
| B | X | 1 | {1,1} | 1 | REGULARITY | REGULARITY |
| ... | ... | ... | ... | ... | ... | ... |
| C | X | 1 | {1,1} | 1 | REGULARITY | REGULARITY |
| ... | ... | ... | ... | ... | ... | ... |
| ID | B | 0 | {1,1} | 1 | REGULARITY | REGULARITY |
| ... | ... | ... | ... | ... | ... | ... |

FIG.27A

| SERVER LOAD | count | SERVER ID | PID | range start | range end |
|---|---|---|---|---|---|
| 50% | 5000 | 1 | 1 | 0 | 99 |
| 60% | 6000 | 2 | 2 | 100 | 199 |
| 50% | 5400 | 3 | 3 | 200 | 249 |
| 60% | 5600 | 4 | 4 | 250 | 299 |
| 75% | 5000 | 5 | 5 | 300 | 999 |

FIG.27B

| DEPENDENCY (EXAMPLE: EXCEPTION RATIO OF ID→PID(X)) | SERVER LOAD | count | SERVER ID | PID | range start | range end |
|---|---|---|---|---|---|---|
| 1/100 | 50% | 5000 | 1 | 1 | 0 | 99 |
| 5/100 | 60% | 6000 | 2 | 2 | 100 | 199 |
| 1/100 | 50% | 5400 | 3 | 3 | 200 | 249 |
| 2/100 | 60% | 5600 | 4 | 4 | 250 | 299 |
| 1/100 | 75% | 5000 | 5 | 5 | 300 | 999 |

FIG.28A

| K1 | K2 | REGULARITY RATIO OF K1→K2 | EXCEPTION RATIO OF K1→K2 |
|---|---|---|---|
| A | B | 0.8 | 0.2 |
| B | A | 0.1 | 0.9 |
| A | X | 0.1 | 0.9 |
| X | A | 0.1 | 0.9 |
| B | X | 0.1 | 0.9 |
| X | B | 0.7 | 0.3 |

FIG.28B

| K1 | K2 | WHETHER TO APPLY PID TO K2 | REGULARITY RATIO OF K1→K2 | EXCEPTION RATIO OF K1→K2 |
|---|---|---|---|---|
| A | B | 0 | 0.8 | 0.2 |
| B | A | 0 | 0.1 | 0.9 |
| A | X | 1 | 0.1 | 0.9 |
| X | A | 0 | 0.1 | 0.9 |
| B | X | 1 | 0.1 | 0.9 |
| X | B | 0 | 0.7 | 0.3 |

FIG.29A

| QUERY | PARTITIONING KEY |
|---|---|
| Q1 | ID |
| Q2 | ID |
| Q3 | X |

FIG.29B

| QUERY | PARTITIONING KEY | RANGE FLAG |
|---|---|---|
| Q1 | ID | 0 |
| Q2 | ID | 0 |
| Q3 | X | 1 |

FIG.39

DATA WINDOW

| ID | X | ... | PID(X) |
|---|---|---|---|
| 1 | 8 | ... | 3 |
| 2 | 1 | ... | 1 |
| 3 | 6 | ... | 2 |
| 4 | 3 | ... | 1 |
| 1 | 7 | ... | 2 |
| 2 | 2 | ... | 1 |
| 3 | 7 | ... | 2 |
| 4 | 2 | ... | 1 |
| 1 | 6 | ... | 2 |
| 2 | 3 | ... | 1 |
| 3 | 8 | ... | 3 |
| 4 | 1 | ... | 1 |

$$PID(X) = \begin{cases} 1 & \text{if } 1 \leq X < 4 \\ 2 & \text{if } 4 \leq X < 7 \\ 3 & \text{if } 8 \leq X \leq 10 \end{cases}$$

COUNT OCCURRENCE NUMBER FOR EACH COMBINATION OF ID, PID(X)

COMBINATION COUNTER TABLE

| K1 | K2 | COMBINATION VALUE OF K1, PID(K2) | OCCUR-RENCE NUMBER | COMBINATION STATE (K1→K2) | COMBINATION STATE (K1←K2) |
|---|---|---|---|---|---|
| ID | X | [1,3] | 1 | EXCEPTION | REGULARITY |
| ID | X | [1,2] | 2 | REGULARITY | REGULARITY |
| ID | X | [2,1] | 3 | REGULARITY | REGULARITY |
| ID | X | [3,2] | 2 | REGULARITY | EXCEPTION |
| ID | X | [3,3] | 1 | EXCEPTION | EXCEPTION |
| ID | X | [4,1] | 3 | REGULARITY | EXCEPTION |

ADDED UP → REGULARITY RATIO OF ID→X: 10/12, EXCEPTION RATIO OF ID→X: 2/12

ADDED UP → REGULARITY RATIO OF X→ID: 6/12, EXCEPTION RATIO OF X→ID: 6/12

ABOVE PID INFORMATION IS CALCULATED BASED ON DATA OF DATA WINDOW AND INFORMATION OF PARTITION TABLE, DURING CALCULATION OF COMBINATION COUNTER TABLE

DATA PROCESSING METHOD AND DATA PROCESSING APPARATUS

CROSS-REFERENCE TO RELATED APPLICATION

This patent application is based upon and claims the benefit of priority of the prior Japanese Patent Application No. 2014-195367 filed on Sep. 25, 2014, the entire contents of which are incorporated herein by reference.

FIELD

The embodiments discussed herein are related to a data processing method and a data processing apparatus.

BACKGROUND

With the popularization of the Internet and cloud computing, there is increased demand for performing processes in a real-time manner on big data provided from various information sources, devices, sensors, etc., connected to a network. Data stream processing technology provides ways to process big-data in such a real-time manner.

In data stream processing, by describing the process contents as "queries" having a high level of abstraction, it is possible to perform programming in a simple, easily comprehensible, and highly efficient manner. A query used in the data stream is also referred to as a "continuous query".

Unlike a query in the database field, a continuous query is resident in a computer, and every time new data is input from a sensor, etc., the continuous query processes the input data and outputs a result. A continuous query is not terminated unless an instruction to stop is given from the user. Hereinafter, a data stream processing "continuous query" is referred to as a "query".

A data stream "program" is constituted by a plurality of queries, and data from sensors or other sources is sequentially processed by this plurality of queries. Load balancing of a data stream program can be performed by either query partitioning or data partitioning. In query partitioning, a plurality of queries are assigned to a plurality of servers in a one-on-one manner, such that the load is balanced among the servers. However, when the processing load of one query among the plurality of queries becomes heavy, the server to which this query is assigned may become a bottleneck.

In data partitioning, the data flowing in an input stream or an intermediate stream is partitioned into a plurality of sub sets (partitions), and the partitions are assigned to the servers. The assignment status of the partitions and the servers is managed by a partition table. Each server constantly manages the partition table and updates it to the latest state whenever necessary. This way, a single query may be processed by a plurality of servers, and load balancing of the queries becomes possible.

Specifically, for each event flowing in the stream, the partition to which the event belongs is determined according to the value of a particular function (hereinafter, "partitioning function") with respect to the values of a particular set of attributes (hereinafter, "partitioning key set"). Then, based on the partition table, the server assigned to the determined partition is determined, the event is transferred to the determined server, and data processing of the event is executed at the server to which the event has been transferred.

Two types of queries and their associated load balancing mechanisms are considered: general queries and range queries. The processing of general queries can be done by grouping together events that share the same value for a specific attribute, or partitioning key, and processing each group of events separately. Therefore, load-balancing of a general query can be done by partitioning input events according to the values of the partitioning key. For general queries, the partitioning key is usually an attribute whose values are discontinuous. Hereinafter, such attributes are also referred to as categorical attributes. In comparison, the processing of a range query depends on input events for which the values of a given attribute, or partitioning key, fall within a specific range of values. Therefore, load balancing for range queries is usually done by segmenting the space of values taken by the partitioning key and processing each segment separately.

In a range query, the target data being held is defined by data sections referred to as data windows.

Patent Document 1: Japanese Laid-Open Patent Publication No. H9-212528

Non-patent Document 1: Hershberger, J., Shrivastava, N., Suri, S., & Tóth, C. D. (2004). Adaptive spatial partitioning for multidimensional data streams. In Algorithms and Computation (pp. 522-533). Springer Berlin Heidelberg. http://citeseerx.ist.psu.edu/viewdoc/summary?doi=10.1.1.157.9503

With respect to a process in which a general query and a range query are serially connected, in a status where the data volume is small and only a small number of servers are performing the process, load balancing each query separately can be done without severely impacting the throughput of the system.

However, when the data volume is increased and an increased number of servers are used to process the queries, it is not possible to find out a dependency between the partitioning keys of the general query and those of the range query, and therefore data that has been processed by the general query in a certain server is not guaranteed to be processed by the range query within the same server. As a result, the volume of data transferred from server to server between the two queries increases, which in turn causes a decrease in the throughput of output data with respect to the events flowing in the stream.

In order to address the above problem, one approach is to find out a dependency between a partitioning key of the general query and a partitioning key of the range query and group together the general query and the range query, to reduce the communication cost of data arising between the servers. However, even by grouping the queries, if a perfect dependency cannot be found between the partitioning keys of the general query and those of the range query, the number of events that invalidate this dependency (hereinafter, "exception event") compared to the number of events that do not invalidate the dependency (hereinafter, "regular events") increases, and the throughput cannot be increased by adding more servers to the system. Hereinafter, for each dependency, the number of exception events divided by the sum of exception events and regular events is referred to as "exception ratio". Similarly, the number of regular events divided by the sum of exception events and regular events is referred to as "regularity ratio".

SUMMARY

According to an aspect of the embodiments, a data processing method is executed by a computer to perform distributed processing of a first query and a second query. The data processing method includes calculating a first value indicating a dependency between a first partitioning key and a second partitioning key, the first partitioning key specifying a categorical attribute extracted from syntax of the first query, and the second partitioning key specifying a numerical attribute holding numerical values associated with the second query; generating a query group made of the first query and the second query based on the first value; and performing distributed processing of the first query and the second query based on the query group when executing the first query and the second query.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 1 represents an example of the definition a query;

FIG. 2 represents an execution example of the query Q1 described in FIG. 1;

FIG. 3 represents an example of the definition a time window;

FIG. 4 represents the execution of the time window described in FIG. 3;

FIG. 13 represents an example of adjusting the range width in response to unbalanced load;

FIGS. 14A and 14B represent an example of dynamic load balancing for a range query;

FIG. 15 represents an example of a partition table used to dynamically balance the load of a range query;

FIG. 20 represents a calculation example of the exception ratio and the regularity ratio of a dependency;

FIG. 23 represents how the fine granularity of a partitioning key can result in a high exception ratio;

FIGS. 26A and 26B represent examples of combination counter tables;

FIGS. 27A and 27B represent examples of partition tables;

FIGS. 28A and 28B represent examples of dependency tables;

FIGS. 29A and 29B represent examples of partitioning key tables;

FIG. 39 represents an example of reducing the exception ratio according to an embodiment of the present invention;

DESCRIPTION OF EMBODIMENTS

Figures 5, 6:
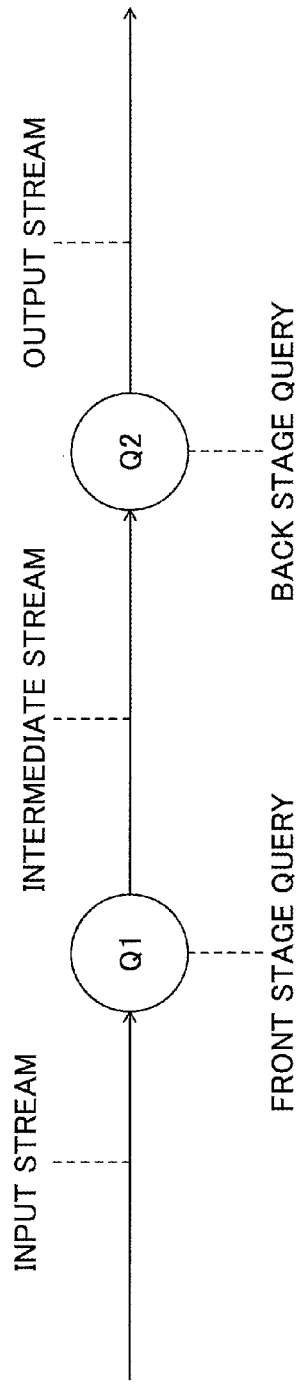
FIG. 5 represents an example of a data stream program.
FIG. 6 represents an example of a partition table for a general query.

Embodiments of the present invention will be explained with reference to accompanying drawings. Note that in the present specification and drawings, constituent elements having substantially the same functions are denoted by the same reference numerals and overlapping explanations are omitted.

(Data Stream Processing Model)

First, an overview of data stream processing is provided. Two types of queries are considered: general queries and range queries. The processing of general queries can be done by grouping together events that share the same value for a specific attribute, or partitioning key, and processing each group of events separately. Therefore, load-balancing of a general query can be done by partitioning input events according to the values of the partitioning key. For general queries, the partitioning key is usually an attribute whose values are discontinuous. Hereinafter, such attributes are also referred to as categorical attributes. In comparison, the processing of a range query depends on input events for which the values of a given attribute, or partitioning key, fall within a specific range of values. Therefore, load balancing for range queries is usually done by segmenting the space of values taken by the partitioning key into regions and processing each region separately. The partitioning key of a general query is usually extracted from the syntax of that general query. The actual values of a partitioning key are the data values included in the input stream data. Those values are usually non-continuous values and can be considered as categorical values. For example, categorical attributes can be used to identify areas such as a town, a country, a ward, etc., or gender such as male or female.

Figures 10, 11:
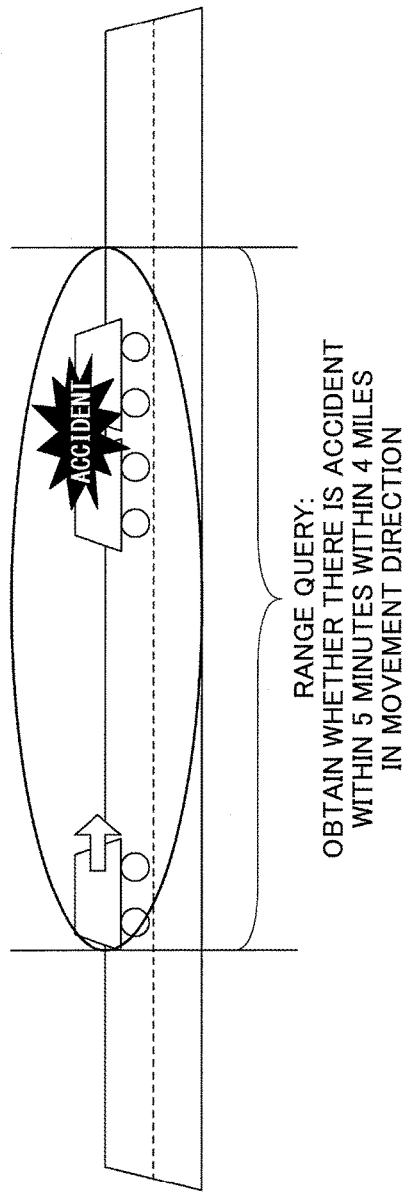
FIG. 10 represents an example of a range query.
FIG. 11 represents an example of the definition of a range query.

A range query can be used to search for relative events, or target events, that are located within a specific target range. The target range is usually defined by the syntax of the range query. FIG. 10 represents an example of a range query that determines the presence of an accident within four miles in the forward direction of a vehicle. A range query usually has two input streams: one input stream for triggering events, such as a vehicle location event, and a second input stream for target events, such as accidents. When a triggering event is received, the range query compares it with previously received target events in order to find the relevant target events. For this purpose, the range query must hold previously target events in memory. The amount of target events to be kept in memory can be specified by defining a data window in the syntax of the range query. The length of a data window can be defined either by a number of events (e.g. the last five events), or by a time span (e.g. all events received within the last five minutes). The partitioning key of a range query is extracted from its syntax. Usually, the partitioning key of a range query is set to the attribute that defines the target range of the range query. For example, the partitioning key of a range query that looks for events whose location is close to each other will be the attribute or the set of attributes that defines the location of each event. For example, the set of location-defining attributes could be a set of coordinates with continuous values.

Load balancing of a range query is usually done by region partitioning: the space of partitioning key values is segmented into regions, and each region is assigned to a different server for processing. To ensure that each server is assigned a uniform work load, the size of each region can be decided in function of the statistical distribution of the partitioning key values.

An example of the data of events of a certain number of newest events or events within a certain period and space, i.e., continuous data within a predetermined section, is the data presented in the space surrounded by the outer frame in FIG. 14A. An example of an area divided according to the distribution of coordinates of continuous data within a predetermined section, is each sub-division of the outer frame in FIG. 14A (for example, the sub-divisions Ba, Bb, . . . ). Each data point present in the space surrounded by the outer frame in FIG. 14A has an attribute representing any one of the sub-divisions. Hereinafter, each sub-division is also referred to as "area".

The general query is an example of a first query that performs a load-balancing process based on a first partitioning key with respect to a plurality of data items that are sequentially input. Furthermore, the range query is an example of a second query that performs a load-balancing process based on a second partitioning key with respect to continuous data within a predetermined section, among a plurality of data items that are sequentially input.

The data processing method according to the present embodiment provides a load balancing method by which the maximum throughput of the system is increased, when a data stream program including both a range query and a non-range, general query is processed in parallel on a plurality of servers.

EPL (Event Processing Language) is an example of a query definition language. FIG. 1 represents an example of a query defined in EPL. In the above example, the INSERT INTO clause defines the name of the output stream to which processed events are sent. The SELECT clause specifies the attributes of output events, and the formulas by which those attributes are computed. A formula in the SELECT clause is usually a function of the attributes of the event received from the input stream. The expression "count (*) AS C" in the SELECT clause defines a count aggregation: the number of events that have been received up to now is counted and the result of that count is set in attribute C. The FROM clause specifies the input stream of the query. The "GROUP BY A" clause means that the count(*) aggregation in the SELECT clause is performed separately for each value of attribute A: for each value of attribute A, the number of events having that value is counted.

When the query processes events, the query holds the intermediate result as an internal state, and the query updates the internal state in an incremental manner every time a new event is received, such that reprocessing does not have to be performed on all of the past events. FIG. 2 represents an execution example of the query Q1 described in FIG. 1. In FIG. 2, input events received by query Q1 have two attributes, namely A and B. Hereinafter we say that the input stream of query Q1 is of schema (A, B). Because of its "GROUP BY A" clause, query Q1 counts the number of events whose value of A is "1", and the number of events whose value of A is "2". Each time a count value is updated, an output event of schema (A, B, C) is output, and the resulting count value is set in attribute C. At this time, the internal state of query 1 corresponding to the received A value is updated and set to the resulting count value.

A data window is a special type of data stream operator. A data window is used to hold only a certain number of events among the events that have been received from the stream in the past, and processing the events by matching the held events with events that are subsequently received from a different stream.

There are several types of data windows. Typical types are length windows and time windows. A length window holds only a certain number of events. For example, a length window can be defined to hold only the last five events. A time window holds all the events received within a certain period. For example, a time window can be defined to hold all the events received within the last five minutes.

An example of the definition of a time window is presented in FIG. 3. The "win:time (5 min)" in the FROM phase defines a time window that holds all events received from the input stream S2 within the last five minutes. By combining this with "SELECT count(*)", it is possible to count the number of events received from the input stream S2 that have occurred within the last five minutes.

FIG. 4 illustrates the processing of the time window example described in FIG. 3. The events received within the last five minutes are held, and are used as comparison targets by the query. Events older than five minutes are deleted.

A data stream processing "program" is usually constituted by a plurality of queries. For example, the events sent from various information sources, devices, sensors, etc., connected to the network, are received by an input stream of the program presented in FIG. 5. The events are received and processed by a front stage query Q1 connected to the input stream, and the front stage query Q1 outputs an intermediary result. A back stage query Q2 is connected to the output of the front stage query Q1. The back stage query Q2 receives and further processes the result of the front stage query Q1 and outputs a final result. Then, the result of the back stage query Q2 is sent to the output stream of the program, and can be reported either directly to the end-user or to another application. In such a way, the data from various sensors or other data sources can be sequentially processed by a plurality of queries in order to perform a high-level analysis process. The data stream connecting the front stage query Q1 and the back stage query Q2 is referred to as an "intermediate stream".

[Load Balancing Method of a Data Stream Program]

Next, an overview of load balancing for a data stream program is provided. Load balancing of a data stream program can be done either by a "query partitioning" method or a "data partitioning" method. The query partitioning method balances the load of the servers by assigning each query to one of the servers. However, when the processing load of one query becomes heavy, the server to which this query is assigned may become a bottleneck.

In the present embodiment, load balancing is handled by the data partitioning method. In data partitioning, the data flowing in the input and intermediate streams is divided into a plurality of subsets (partitions), and each partition is assigned to a server. That is to say, in data partitioning, by balancing the data assigned to each server results in balancing the processing load of each server. The assignment status of partitions to servers is managed by a partition table. Each server constantly holds the latest copy of the partition table. This way, a single query may be processed by a plurality of servers, and load balancing of the queries becomes possible.

Specifically, for each event flowing in an input or intermediary stream, the partition to which the event belongs is determined according to the value of a particular function (partitioning function) with respect to the values of a particular set of attributes (partitioning key set). Then, based on the partition table, the server to which the determined partition is assigned is determined, the event is transferred to the determined server, and the event is processed at the server to which the event has been transferred.

FIG. 6 represents an example of a partition table. The partition table indicates the partitioning status of one query. Each line indicates the assignment status of a specific partition. The PID (partition ID) field indicates the identifier of the partition. PID is usually determined by the value of the partitioning key set of the query (for example, attribute X), and may thus be described as PID (X) in the present application. The server ID field indicates the identifier of the server to which the partition identified by PID is assigned. The count field indicates the number of events belonging to the partition identified by PID. The server load field indicates the load status of the server identified by the server ID. The present embodiment indicates an example in which the server load field does not distinguish resources such as a CPU or memory; however, the resources may be distinguished by adding a field for each resource.

In query partitioning, load balancing is done by assigning each query to one of the servers; however, when the processing load of one query becomes heavy, the server to which this query is assigned may become a bottleneck. Meanwhile data partitioning helps normalizing the volume of data processed by each server, such that each server receives a similar volume of data. However, it may happen that one particular server receives a significantly larger data volume than other servers. In such a case query processing on that server can be slowed down, and this server might become a bottleneck.

In order to perform data partitioning efficiently, it is important that the processing of all the queries of a program is performed in the first server to which all events are transferred. This is because, if an event needs to be retransferred from the first server to another server in order to process the event, the data communication cost in the network increases, the performance of the system is degraded, and the overall throughput may decrease. Determining whether an event may be processed in the first server to which the event is transferred without being retransferred can be done by analyzing the syntax of each query and the partitioning keys that can be used for partitioning each query.

Figure 7:
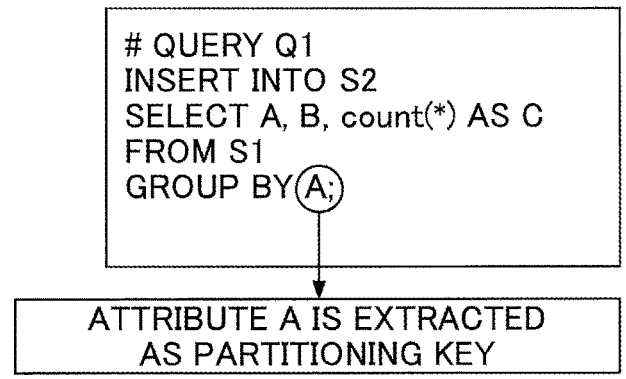
FIG. 7 represents an example of partitioning key extraction from query syntax.

For example, in the case of query Q1 in FIG. 6, the syntax of "GROUP BY A" means that one independent state is present for all values of attribute A, and one event may be processed only with regards to the state that is associated to the event's value of attribute A. That is to say, by using attribute A as the partitioning key when performing load balancing, all events may be processed by the value of attribute A in the server to which the events are transferred, without being retransferred. Thus, in order to efficiently perform load-balancing on the query Q1, attribute A needs to be extracted and used as the partitioning key of Q1, as is presented in FIG. 7. In data partitioning, the partitioning keys of a query can be extracted from the query's syntax as explained above. This way, all the events that share a same value for attribute A are transferred to the same server, which makes it possible to avoid additional data transfer between servers.

Figure 8:
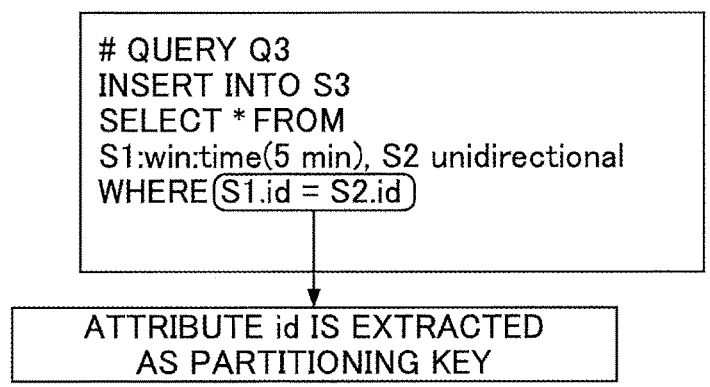
FIG. 8 represents another example of partitioning key extraction from query syntax.

FIG. 8 represents another example of extracting a partitioning key from the syntax of a query. A query Q3 receives events from input streams S1 and S2, holds events received from S1 in a time window of five minutes, compares events received from S2 with events of S1 stored in the time window, joins compared events of S1 and S2 that have a matching attribute ID value, and outputs the combined events. A join operation which uses an equality operator in its conditional expression is referred to as an equi-join query. In such an equi-join query, query syntax analysis can be done to extract the attribute(s) used in the conditional expression and assign them as the partitioning key(s) of the query.

Figure 9:
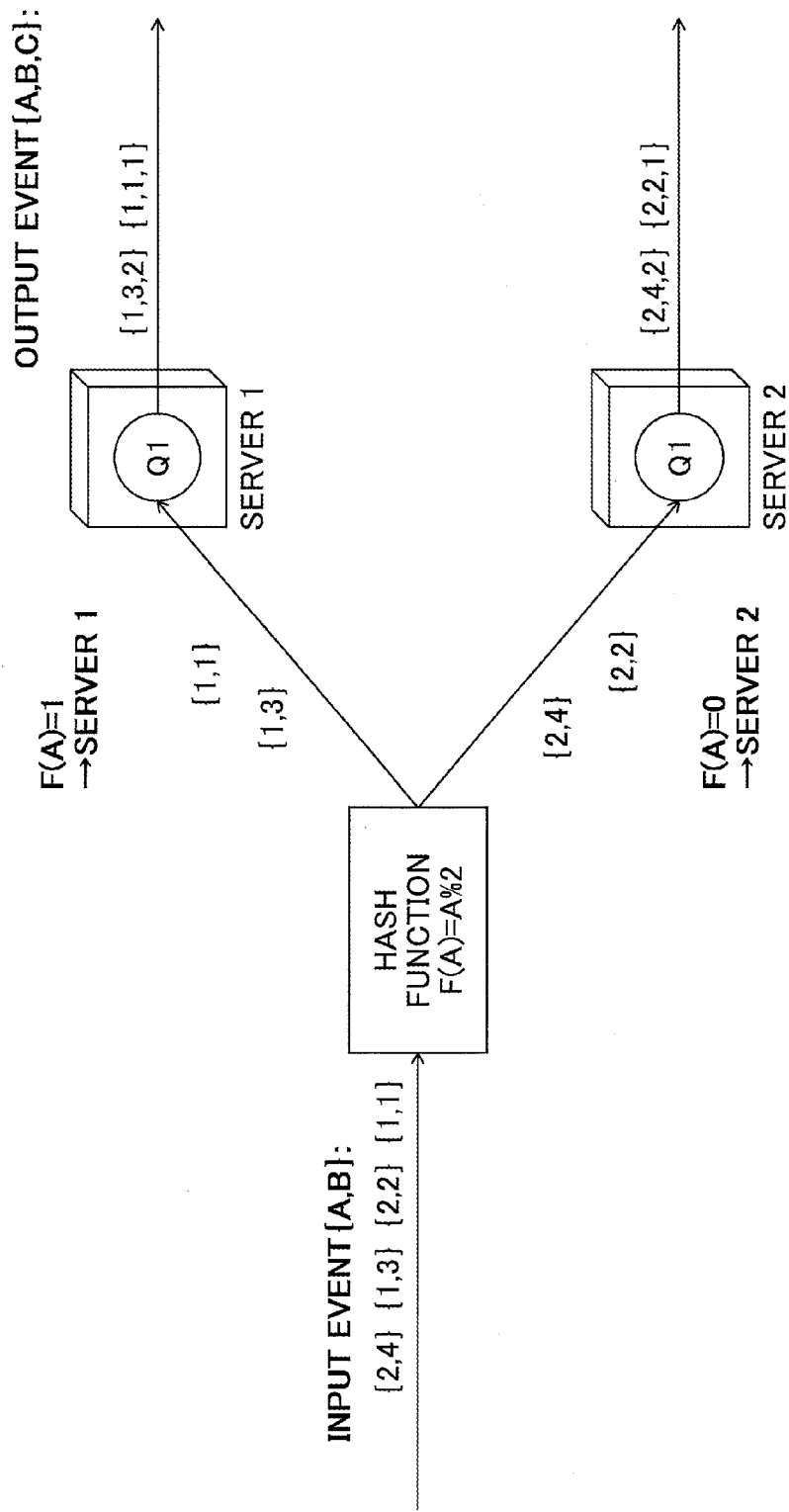
FIG. 9 represents an example of data partitioning.

After the partitioning key, the partitioning function needs to be determined. A modulo (the remainder of dividing by the number of servers) is often used as the partitioning function. When the type of attribute used for the partitioning key is not a numeric value, an additional hashing function can be used to convert it to a numeric value before invoking the modulo function. Any function other than modulo may also be used, as long as the function returns the same F(A) every time with respect to the same value of A. FIG. 9 illustrates an example of data partitioning. Depending on whether the remainder of the function "A %2" is 1 or 0, the input event is transferred to either server 1 or server 2. In the present embodiment, the data processing method is based on the premise of load balancing by data partitioning, and a method of determining the above partitioning key and the partitioning function.

A query for detecting whether the distance between objects is within a certain range, is referred to as a "range query". FIG. 10 illustrates a specific example of a range query. For example, to a driver of a vehicle travelling along a road, a report is given as to whether an accident has occurred within the latest past five minutes up to four miles ahead in the movement direction of the vehicle.

In order to realize such a range query, for example, the range query is described in EPL by a program as illustrated in FIG. 11. In the FROM clause, Accidents is the data stream, and when an accident is detected, an event flows in the Accidents stream. In Accidents.win:time(5 minutes) in the FROM clause, a time window for holding the accidents in the latest past five minutes is defined. When an event is received from the LocationReports stream, the received event is matched with the Accidents event within the latest five minutes held in the window. The matching is performed by a condition in the where clause, as explained below.

Coordinates v.x expressing the position of the vehicle are compared with coordinates a.x expressing the position where an accident detected within the latest past five minutes has occurred. When a.x is within four miles in the movement direction, the condition is satisfied, and the LocationReports event is joined with the associated Accidents event.

[Load Balancing Method of Range Queries]

Next, the method used to load-balance a range query is explained. Hereinafter, this method is also referred to as "range partitioning"). When balancing the load of a range query, a coordinate x used in the condition formula of the range search is used as the partitioning key, and a partitioning function for dividing the value of x into a plurality of arbitrary ranges is used. Furthermore, in the present embodiment, one partition is assigned to one server.

Figure 12:
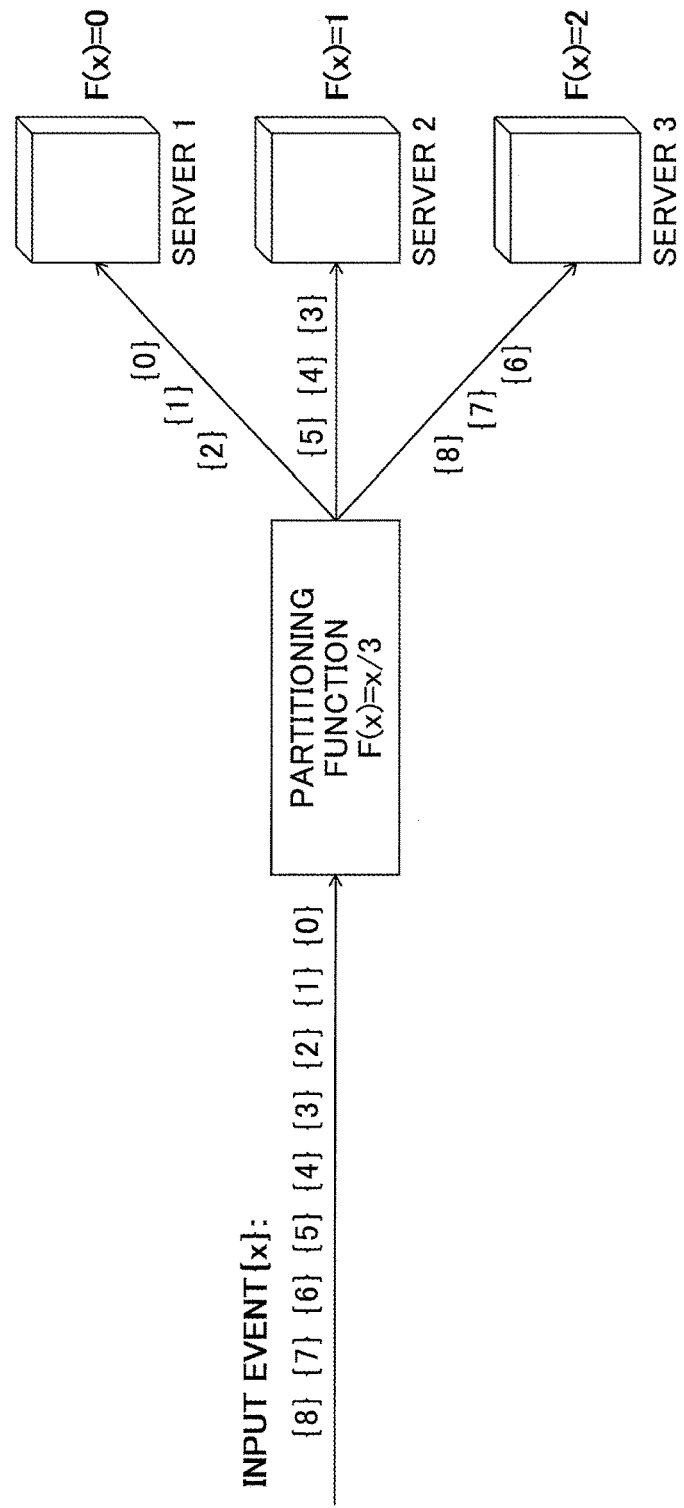
FIG. 12 represents an example of range partitioning.

For example, in FIG. 12, the range of the x value of the input event of schema (x) is [0,8] (a range including 0 and 8), the range query is load-balanced among three servers, and the partitioning function F is set as "F(x)=x/3" (remainder of division is rounded down). In this case, the range of the value of x [0,2] is transferred to server 1, [3,5] is transferred to server 2, and [6,8] is transferred to server 3.

Any function other than "F(x)=x/N" (remainder of division is rounded down, N=number of servers) may be used as the partitioning function of a range query. Furthermore, in accordance with the amount of events and their spatial distribution, the partitioning function may be dynamically changed. In the case of "F(x)=x/N", the width of the range of x values handled by each server becomes fixed at N; however, by using another function, the width of the range of x values handled by each server may vary as illustrated in FIG. 13. If the partitioning function is fixed during the execution of a range query, the load on each server may become unbalanced if the events related to a particular x value occur more frequently than for other x values, as this would result in more events sent to one particular server. To avoid load unbalance and ensuring that each server is sent an equal number of events, the range including that particular value may be reduced by dynamically changing the partitioning function.

When balancing the load of the program of a data stream constituted by a plurality of queries by using data partitioning, the maximum throughput is affected by the following parameters. In order to maximize the throughput, the combination of optimum parameters needs to be obtained from the adjustable parameters indicated below.

1. Adjustable Factors (Targets of Optimization)
   Partitioning key(s) used for the partitioning of each stream
   Partitioning function used for the partitioning of each stream
   Number of events to be transferred to each server
   In the case of a range query, granularity of partitioning (width of the range of partitioning key values handled by each server)

2. Non-Adjustable Factors (not Targets of Optimization)
   Amount of data flowing in each stream
   Correlation between attributes in the data flowing in each stream Note that in the present embodiment, the partitioning key is the attribute (a plurality of attributes may be used) used for the partitioning function for data partitioning. Furthermore, the granularity of partitioning is the width of the range of partitioning key values handled by each server.

Furthermore, in the present embodiment, the maximum throughput is defined as the maximum number of events that may be processed within one second by a distributed system. Note that here, a system refers to the physical server and networking resources used to process the data streams.

An explanation is given of a technique of dynamically balancing the load of a range query, and a technique of maximizing the throughput when balancing the data stream process, for obtaining the combination of optimum parameters.

[Technique Used to Dynamically Balance the Load of a Range Query: Hereinafter, "Dynamic Range Partitioning"]

Dynamic range partitioning makes it possible to dynamically adjust the width (granularity) of the range handled by each server during the execution of a range query, based on the spatial distribution of the streaming data. FIGS. 14A and 14B illustrate an example of dynamically adjusting the partitioning grain when using dynamic range partitioning. Dynamic range partitioning makes it possible to dynamically adjust the width of the two-dimensional range according to the spatial distribution of the data. First, the space represented by the partitioning key is divided into several areas, and each area is assigned to one server in a one-on-one manner. Areas including a large data volume (areas Be, Bb in FIG. 14A) are partitioned into small areas, and areas including a small data volume are partitioned into large areas, such that an equal load (data volume) is applied to the respective servers. As a result, the usage ratio of the CPU and the memory of the respective servers is equal.

Furthermore, with dynamic range partitioning, the load balancing is dynamically performed. When the data volume rapidly increases in a certain area, and it is not possible for a single server to process the data, this area is further divided, and servers are added and the sub-divisions are assigned to the added servers, such that the load of the servers is dynamically balanced. As a result, it is possible to avoid that any of the servers becomes a bottleneck.

Performing load balancing results in the partition table being updated. FIG. 15 represents an example of a partition table of the range query. This partition table is obtained by expanding the partition table for the general query illustrated in FIG. 6. In the case of a range query, each area defined by the fields "range start" and "range end" is assigned with a partition to which the data coming from that area is sent to. When a single area is divided into a plurality of areas for the purpose of load balancing, the partition in the table is also divided into two, and one of the partition IDs of the divided partitions is assigned to a server that has been added. In count, the number of events belonging to each partition is recorded.

In FIG. 14A, two-dimensional data is divided into four areas, and the area having a high load of data among these areas is further divided into four areas. Each area is given a partition ID (PID) for identifying the partition. In the case of a range query, when there is data in a space near the boundary of areas, the range query may cross over two or more areas, and communication occurs between servers in this case. For example, when the data included in the range does not cross over a plurality of areas as in the case of the range query indicated by range R1, communication does not occur between servers. Meanwhile, when the data included in the range crosses over a plurality of areas as in the case of the range query indicated by range R2, communication occurs between servers.

The dynamic load balancing of the range query may be performed in consideration of both "the load of each server" and "communication between servers", and therefore it is possible to prevent a particular resource (server or network) from becoming a bottleneck. Thus, it is possible to select an optimum configuration for maximizing the maximum throughput. The load of each server may be determined by acquiring the load status of the CPU and the memory. In order to recognize the load of the network, the communication cost between servers after load balancing needs to be estimated. The communication cost between servers may be statistically estimated by using the granularity of partitioning as illustrated in FIG. 16.

Figure 16:
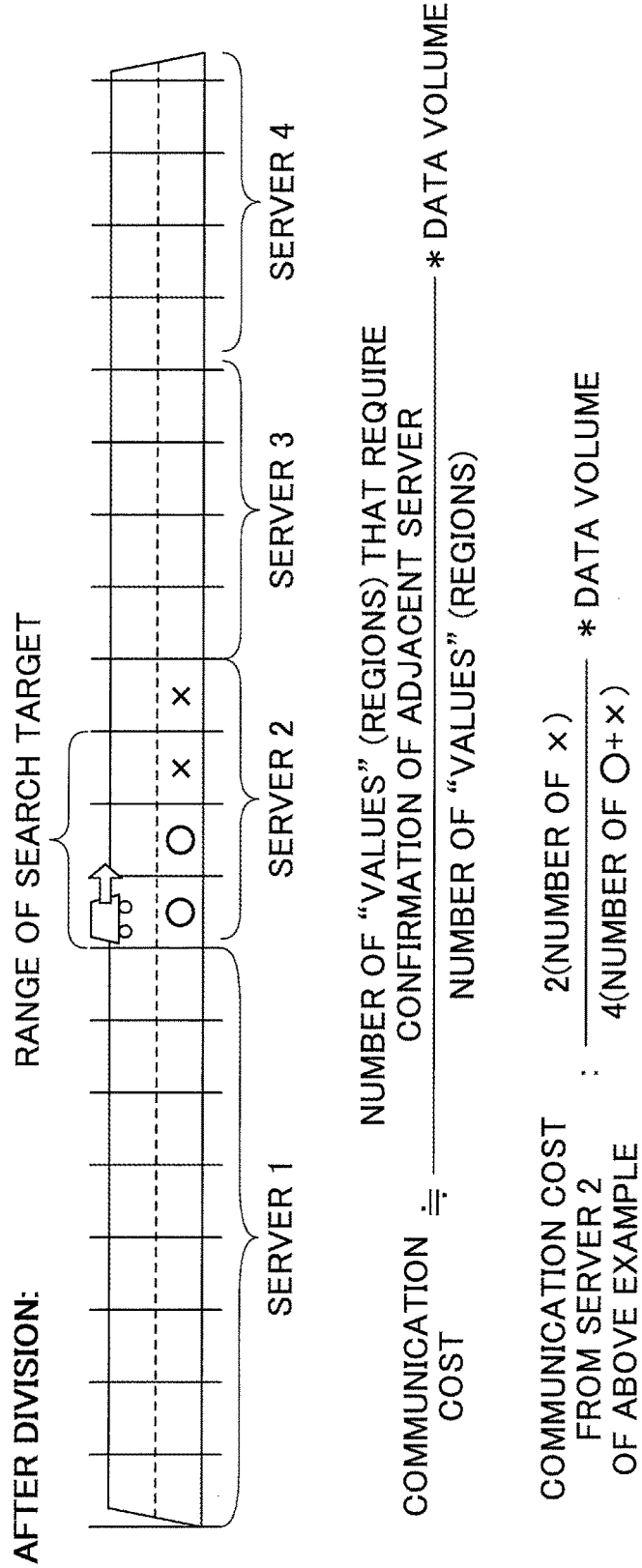
FIG. 16 represents an estimation example of the communication cost between servers when dynamically balancing the load of a range query.

When the target search area crosses three regions, and the vehicle is positioned in the far left region of server 2 and travelling in the direction of the arrow, the targeted search area is the three regions in server 2 illustrated in FIG. 16, and therefore communication does not occur between server 2 and server 3. Similarly, when the vehicle is positioned in the second region from the left of server 2, the targeted search range area is the three regions in server 2, and therefore communication does not occur between server 2 and server 3.

Meanwhile, when the vehicle is positioned in the third or fourth region from the left of server 2, the targeted search range area crosses over server 2 and server 3, and therefore server 3 also needs to be searched. Therefore, communication occurs between servers. Accordingly, the communication cost from server 2 in the example of FIG. 16 can be statistically estimated as: input data volume×2 (number of regions held by server 2 for which the adjacent server needs to be checked)/4 (number of all regions held by server 2).

[Technique Used to Maximize Throughput when Balancing Data Stream Process; Hereinafter, "Harmonized Partitioning"]

Harmonized partitioning is another technique used to maximize the throughput of a distributed data stream process. Harmonized partitioning reduces the communication between queries by partitioning a plurality of stream-connected queries by a common partitioning key and partitioning function. A group of queries connected by streams that share a common partitioning key and partitioning function as explained above, is referred to as a query group.

Figure 17:
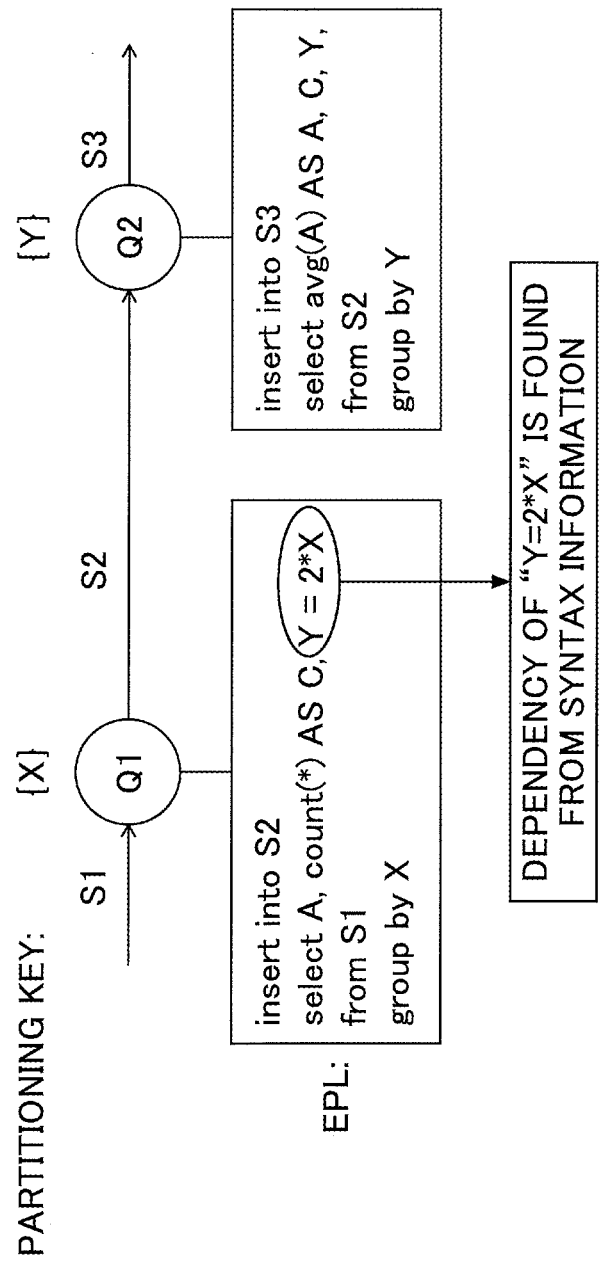
FIG. 17 represents an example of dependency extraction between partitioning keys from query syntax.

One way to find a common partitioning key between a group of queries is to analyze the syntax of each query and extract dependencies between each query's partitioning keys. For example, as illustrated in FIG. 17, it can be inferred from the syntax of query Q1 that attribute Y of the intermediate stream S2 is calculated from attribute X of the input stream S1 by a function of Y=2*X. Therefore, it can be said that Y depends on X. Hereinafter, such a dependency is referred to by the following notation: X→Y.

Figure 18:
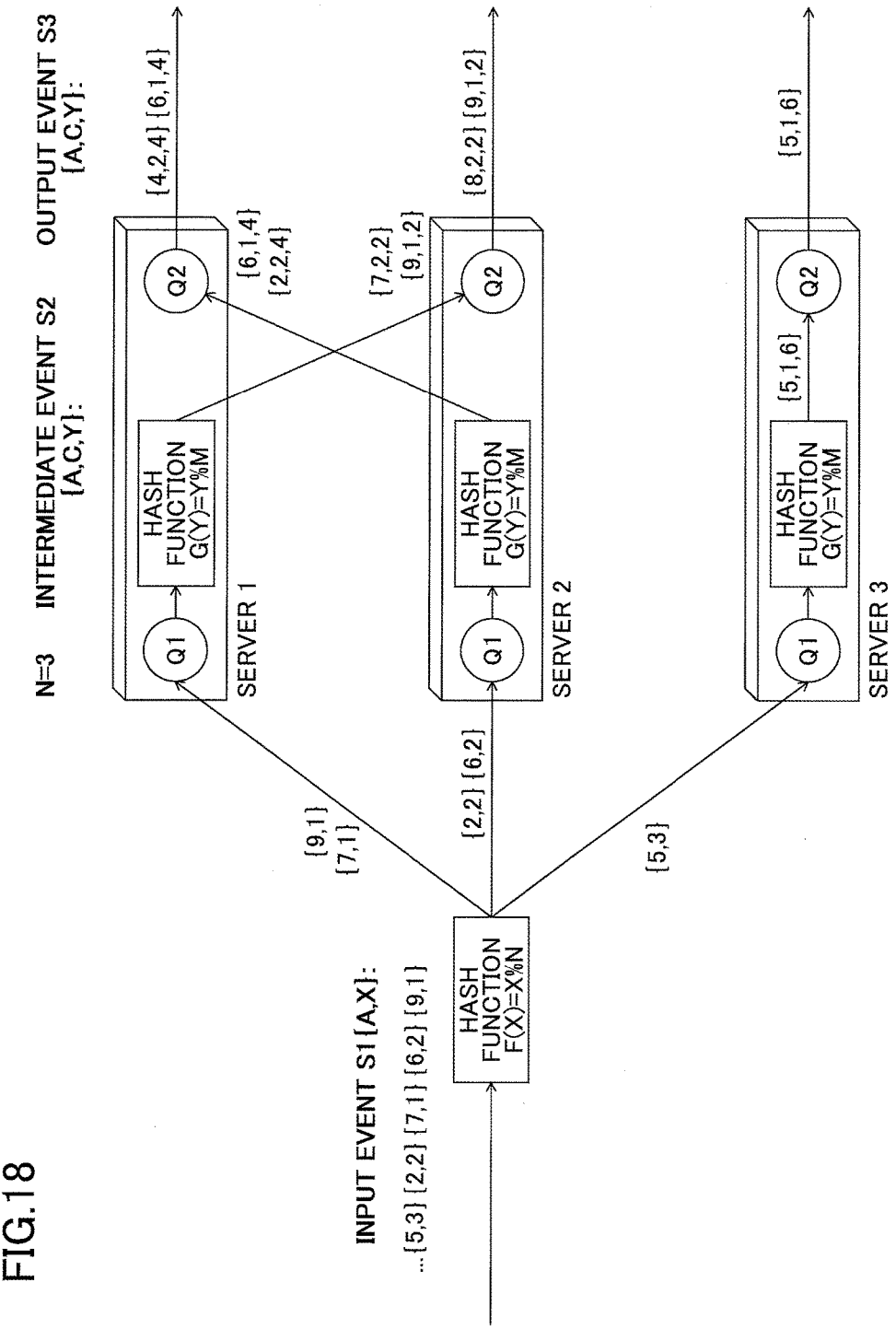
FIG. 18 represents an example of load balancing without using the dependency between partitioning keys.

In this example, attributes X and Y are the group-by keys used by queries Q1 and Q2. As such, they are set as the partitioning keys of queries Q1 and Q2. FIG. 18 illustrates an example in which the dependency X→Y obtained from query syntax is not used, and where Q1 and Q2 are directly partitioned by their partitioning keys X and Y, respectively. For example, it is assumed that an N number of servers (server 1 through server N) are assigned to process queries Q1 and Q2, for the purpose of load balancing. In this case, even though there is a dependency between X and Y, it cannot be assured that the result of the partitioning function F(X)=X % N using X, and the result of the partitioning function G(Y)=Y % M using Y, match each other. Therefore, Q1 and Q2 need to be separately partitioned and allocated, and output events from Q1 need to be transferred to the server of Q2 according to the result of G(Y). When three servers are used to process the data streams, the probability that data communication occurs between the servers is approximately 2/3. Generally, when an N number of servers are used to process the data streams, the probability that data communication occurs between the servers is roughly estimated as (N−1)/N.

Figure 19:
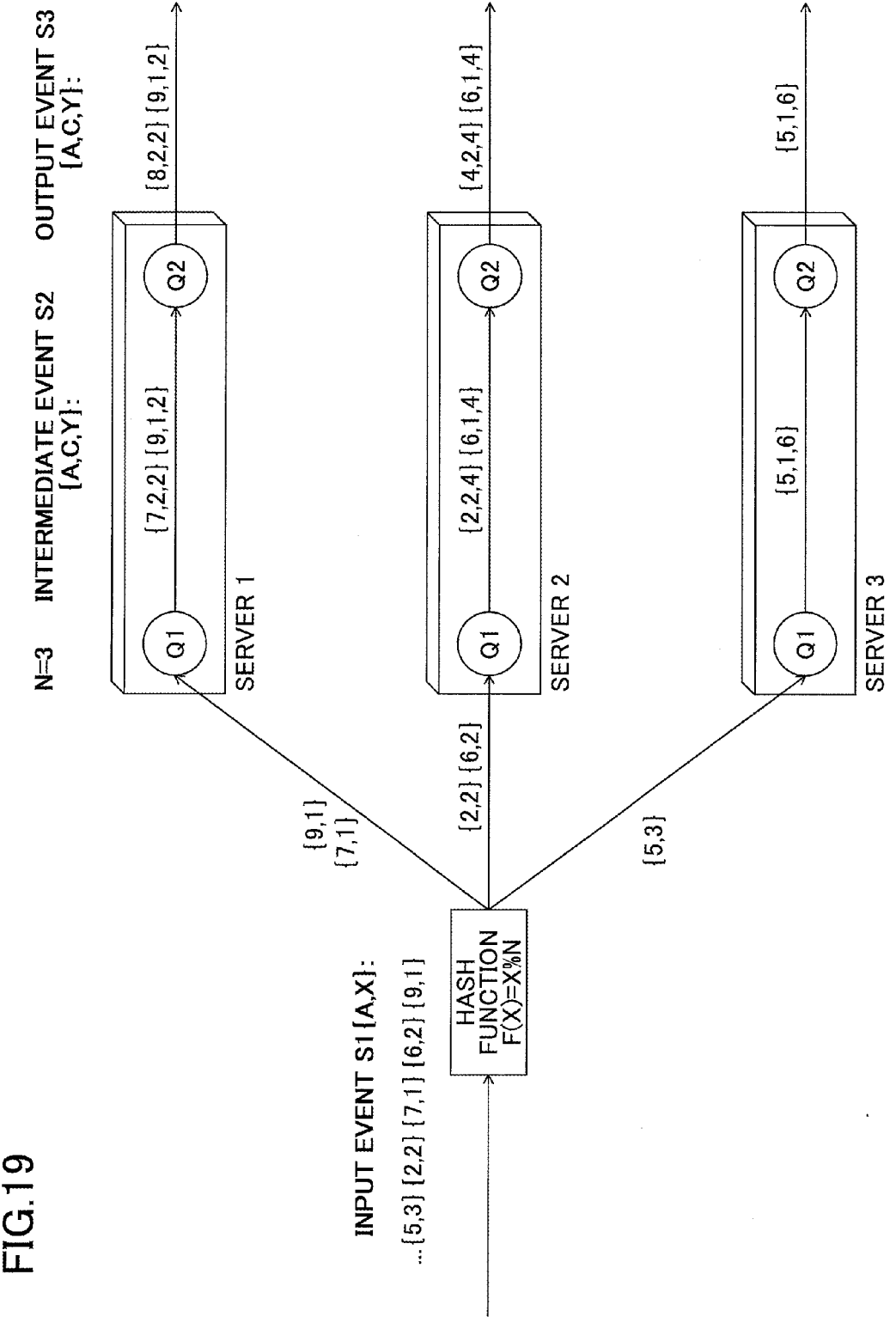
FIG. 19 represents an example of load balancing using the dependency between partitioning keys.

Meanwhile, by using the dependency X→Y (Y=2*X), it is known that there is only one value of Y with respect to all values of X, and therefore it is known that the query Q1 that is partitionable by X, is also partitionable by Y. In this case, by using the same partitioning key Y and partitioning function for the two queries Q1 and Q2, as illustrated in FIG. 19, it is possible to eliminate the communication between servers when sequentially performing the query processes of Q1 and Q2. In this example, the same partitioning key and partitioning function are applied to Q1 and Q2, and therefore it is known that a single server may continuously perform the process of Q1 and Q2, and all servers (N servers+M servers) may be assigned to the query group formed by Q1 and Q2. Furthermore, the output event of Q1 becomes an input event of Q2 which is subsequently executed in the server that has processed Q1, and the query processes of Q1 and Q2 are executed in the same server. Therefore, the communication between servers respectively performing the processes of Q1 and Q2 as illustrated in FIG. 18, does not occur in this example.

When a dependency between partitioning keys cannot be found from query syntax, the values of partitioning keys that actually flow in each stream during the execution of each query may be compared, and a dependency may be found by comparing those values. There may be cases where the dependency that is found during execution is not a perfect dependency, and exceptions may happen. A dependency whose exception ratio (ratio of exception events within the data stream) is lower may be considered as a valid dependency and may therefore be used for creating a query group. A dependency whose exception ratio is high may not be beneficial since creating query groups based on such a dependency may increase the amount of communication between servers and decrease the maximum throughput of the system.

As illustrated in FIG. 20, the exception ratio and the regularity ratio of the dependency between partitioning keys A and B during execution are obtained by comparing the values of Events A and B stored in the data window of the query, and counting the number of occurrences of each combination of the values of A and B. After counting each combination, the value of B that is most frequently associated with each value of A is identified, and the identified value of B is set as the "regular value", and other values of B are set as "exception values".

Then, the total number of occurrences of the "regular value" associated with each value of A is counted, and this total is divided by the number of events inside the data window, to calculate the regularity ratio of the dependency A→B. In FIG. 20, the total number of occurrences "9" of the "regular value" associated with each value of A, is divided by the total number of events "12" inside the data window, and the regularity ratio of the dependency of A→B is calculated as 9/12. The exception ratio is (1−regularity ratio), which is calculated as 3/12.

Similarly, the regularity ratio of the dependency of B→A is calculated by obtaining the total number of occurrences of the value of A that is most frequently occurs with each value of B, and dividing this total by the number of events in the data window. Furthermore, the exception ratio is calculated by (1−regularity ratio). Here, the number of occurrences of A (3×1+1×1) that most frequently occurs for the values of B "6" and "7", is divided by the total number of events "12", and the regularity ratio of the dependency of B→A is calculated as 4/12. The exception ratio is calculated as 8/12(=1−4/12).

The above calculation is performed every time the content of the window changes. Therefore, the occurrences of each combination are counted incrementally by storing the intermediate result in the memory. When an event is added to or deleted from the window, a counter for its corresponding combination is acquired from the values of A and B of the added or deleted event, and the counter is either incremented (in case of a an added event) or decremented (in case of a deleted event). The states of the combination counters (intermediate results) are managed in a single "counter table" for later retrieval.

As illustrated in FIG. 20, the counter table is constituted by six fields. The first two fields, K1 and K2, express the attributes of candidate dependencies. For example, in the line associated with the dependency of A→B or B→A, "A" and "B" are input in the K1 and K2 fields. Under "combination value of K1 and K2", one of all combinations constituted by values of A and B among the events of the window is recorded in each line. Under "number of occurrences", the number of times each combination has occurred in the window is recorded. In the last two fields of combination states, flags are recorded, indicating whether the combination is the regular combination or an exceptional combination with respect to the dependency A→B or B→A.

When data streams are partitioned using a query group created based on an imperfect dependency as explained above exception events are transferred to the wrong server, and must therefore be retransferred to the correct server. When there are many exception events, the communication cost increases due to the retransfer between servers, and therefore the maximum throughput may be worse than in a configuration where a query group is not created. Therefore, to determine whether a candidate dependency is valid, the communication cost after creation of the query group, i.e., the number of exception events, needs to be estimated. When the communication cost estimated for a configuration using a query group based on the candidate dependency is less than the communication cost in a configuration with no query group, the candidate dependency is regarded as valid. When the communication cost in a configuration using a query group based on the candidate dependency is greater than the communication cost in a configuration with no query group, the dependency is not regarded as valid.

When using dynamic range partitioning and harmonized partitioning, it is almost never possible to find a valid dependency between the partitioning key of a range query and the partitioning key of a general query, regardless of the method tried (query syntax analysis or runtime dependency extraction). Therefore, it is not possible to maximize throughput by creating a query group including all queries.

The reasons why no valid dependency can be usually found via query syntax analysis or harmonized partitioning are explained below. The partitioning key of a range query is usually set to an attribute representing coordinates of fine granularity. Meanwhile, an attribute of a large granularity is often used as the partitioning key of the general query. Thus, most of the time, different attributes are used as the partitioning keys of both queries, and a dependency between those partitioning keys cannot found by query syntax analysis. For example, the range key of the range query is usually set to a fine-grained attribute representing the precise location (position) of a person, while the partitioning key of the general query is usually a coarse-grained attribute representing a country or region.

Figure 21:
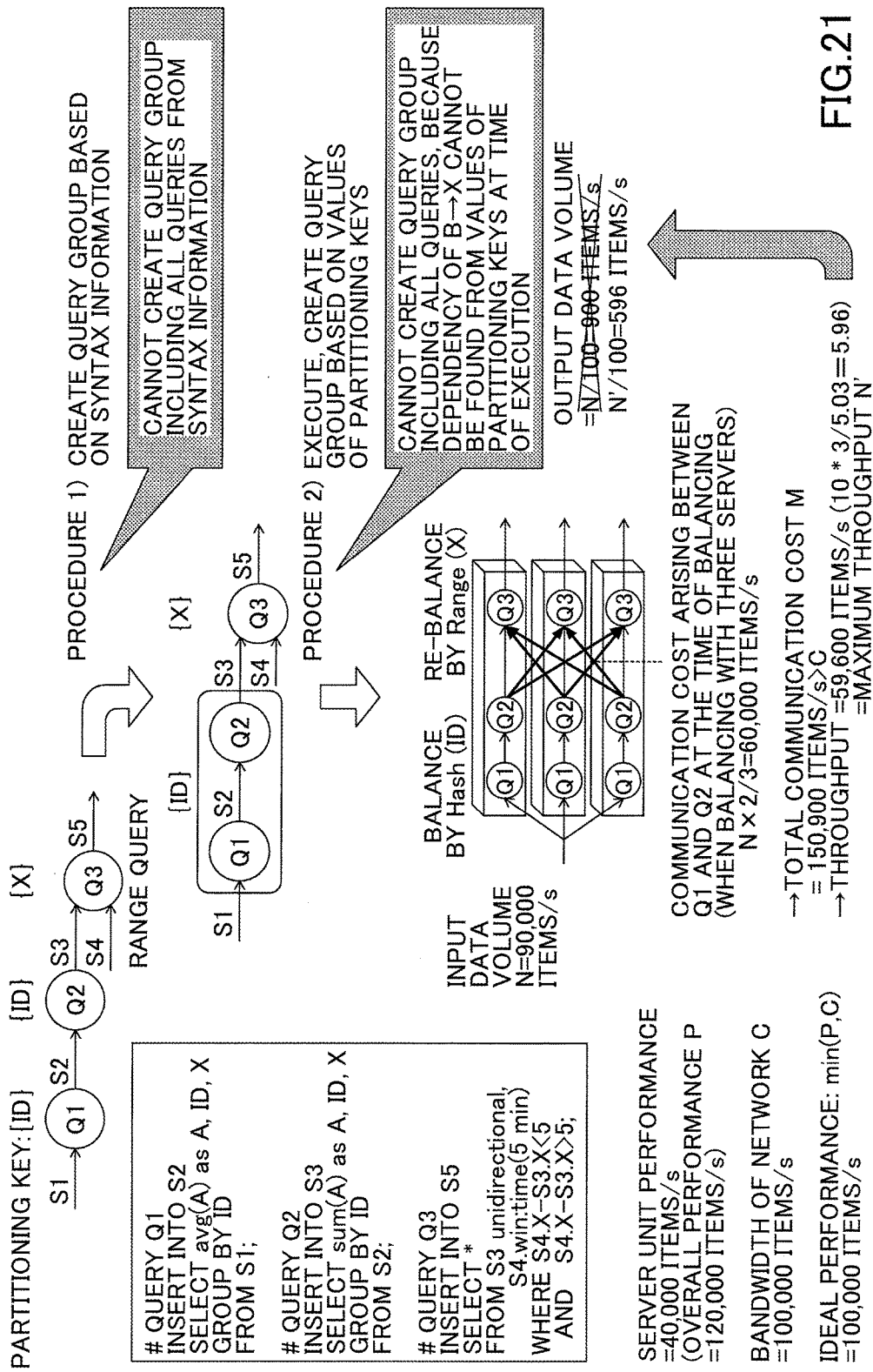
FIG. 21 represents an example of data partitioning in which the maximum throughput decreases.

Because of the difference of grain size between the partitioning keys, it is also difficult to find a valid dependency when using harmonized partitioning. As illustrated in FIG. 21, when a coarse-grained partitioning key ID is used for the general queries Q1 and Q2, and a fine-grained partitioning key X is used for the range query Q3 that is processed after general queries Q1 and Q2, a valid dependency between ID and X cannot be found from query syntax analysis. Therefore, using the procedure 1 presented in FIG. 21, it is possible to create a query group including both Q1 and Q2, but it is not possible to create a query group including all queries from Q1 through Q3.

Figure 22:
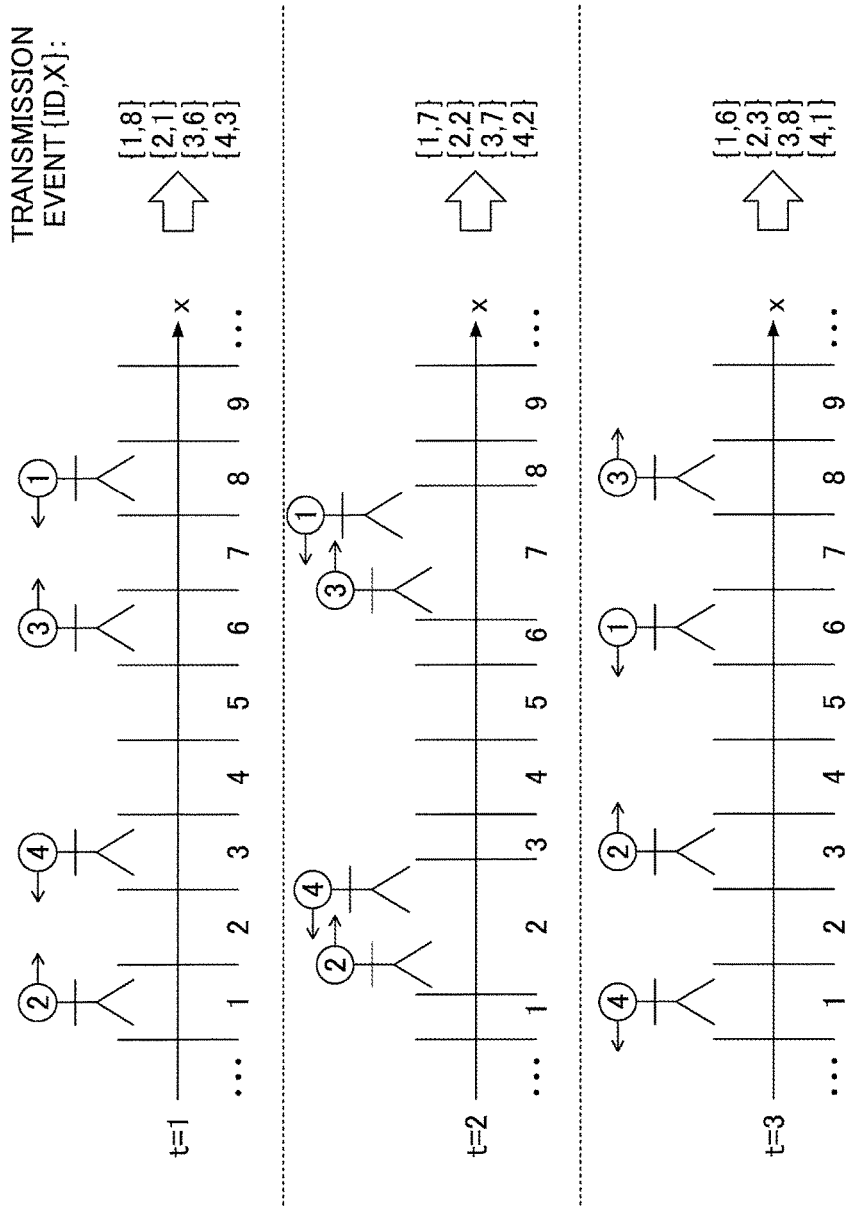
FIG. 22 represents an example of monitored objects whose fine-grained coordinate X changes according to the movement of the object.

Furthermore, using the procedure 2 presented in FIG. 21, an attempt is made to dynamically extract a dependency between the partitioning key of the range query and the partitioning key of the general queries, from data (partitioning key values) flowing in the data stream during execution. As illustrated in FIG. 22, since the coordinate X (partitioning key of the range query) is of fine granularity, the value of X in the event of schema (ID, X) changes each time the person (object) moves in FIG. 22, and it is therefore difficult to find a dependency between the partitioning key ID of the general queries and the partitioning key X of the range query.

As explained above, when it is not possible to constitute a single query group from Q1 through Q3 using either procedure 1 or 2 in FIG. 21, the range query Q3 is partitioned by partitioning key that is different from that of the general queries Q1 and Q2, and the communication cost increases between queries Q2 and Q3. For example, when the input data volume N of Q1 is 90,000 items/s, and the output data volume of Q1 and Q2 remains to be N (assumed that filtering is not performed at Q1 and Q2), the number of events that do not need to be retransferred between Q2 and Q3 are (N/number of servers) items/s, and the number of events to be retransferred is (N−(N/number of servers)) items/s.

Therefore, when three servers are used to process the queries, as illustrated in FIG. 21, the data volume (intermediate communication cost) transferred between Q2 and Q3 is N×2/3=60,000 items/s, and the output stream is N/100=900 items/s. Thus, the total communication cost (=input+intermediate+output) is 150,900 (=90,000+60,000+900) items/s.

However, when the bandwidth C of the network is 100,000 items/s, the condition "C<input data (=N)+communication cost (=N×2/3)"+output data (=N/100) needs to be satisfied (bandwidth C is not to be exceeded). Therefore, the actual throughput T (maximum input volume of data that can be processed without exceeding bandwidth C) is not 90,000 items/s, but is calculated by the formula "$(T+2T/3+T/100=C \leqq T=(3/5.03) \times C$".

As a result, the actual maximum throughput becomes 59,600 items/s, and the servers are under-utilized: the total theoretical performance of 120,000 items/s is not reached. In this configuration, the network is stressed, and therefore the output data volume is capped by the network bandwidth, and decreases from a theoretical value of 900 items/s (when unlimited bandwidth is assumed) to 596 items/s.

The decrease in throughput depicted in FIG. 21 is caused by the fact that no valid dependency could be found between the partitioning keys of the queries. The reason why no valid dependency could be found between the partitioning keys is illustrated in FIG. 22. Since the partitioning key of the range query is set to the coordinates of a movable object, the value of the partitioning key X changes for each new position of that object. FIG. 22 illustrates an example of the coordinate X expressing the positions of the objects of four people and their corresponding events, at three different times (t=1, 2, 3).

The calculations of the regularity ratio and the exception ratio of the dependency based on those events is illustrated in FIG. 23./Since many different values of X are related to the value of one single ID value in the window, the regularity ratio is low, and the exception ratio is high. It is therefore difficult to find a valid dependency ID→X.

The coordinates used in the search formula of a range query, from which the partitioning key of that range query is extracted, are usually attributes of very fine granularity. However, using the same fine-grained attributes for the group-by key or join key of a general query is not convenient since it would produce too many internal query states and may require more memory than available on the processing servers. Therefore, the partitioning key used by a general query, which is extracted from its group-by key or join-key is usually different by nature from the partitioning key of a range query, and no dependency can be found between the range query's partitioning key and the general query's partitioning key simply by analyzing the syntax of each query.

Furthermore, because of the difference in granularity between the partitioning key X of a range query and the partitioning key ID of a general query, no dependency can be found between partitioning key X and partitioning key ID by comparing the data values (values of each partitioning keys) flowing in the data stream during execution of the queries. As a result, it is difficult to create a query group including both a range query and a general query, because any found dependency would feature many exception events to be retransferred between servers during execution, which may lead to a deterioration in throughput.

Since it is not possible to find a valid dependency between the partitioning key X of the range query and the partitioning key ID of the general query from either query syntax of data flowing in the stream during execution, as explained above, the range query and the general query cannot grouped into a query group, which results in an increased communication cost and a reduced maximum throughput during the distributed execution of queries.

Meanwhile, in the data processing method according to the present embodiment described below, the space of coordinates is divided into areas such that the data is equally balanced according to the data partitioning, and a partition ID assigned to each area (hereinafter, also referred to as "PID") is used as the partitioning key of the range query. Since PID has a coarser granularity than coordinate X, it is now possible to find a valid dependency with less exceptions between partitioning key PID of the range query and partitioning key ID of the general query. Using this dependency to create a query group including both the general and the range query, and to partition the data, makes it possible to decrease the communication cost between queries caused by exceptions, and to increase the maximum throughput.

Note that in the data processing method according to the present embodiment described below, a calculation module for calculating a dependency value is also applicable to a range query. Furthermore, in the load balancing of the data processing method according to the present embodiment, two independent load balancing modules for a range query and for a general query may be combined in a single integrated module.

[Functional Configuration and Flow of Process of Data Processing Apparatus]

Figure 24:
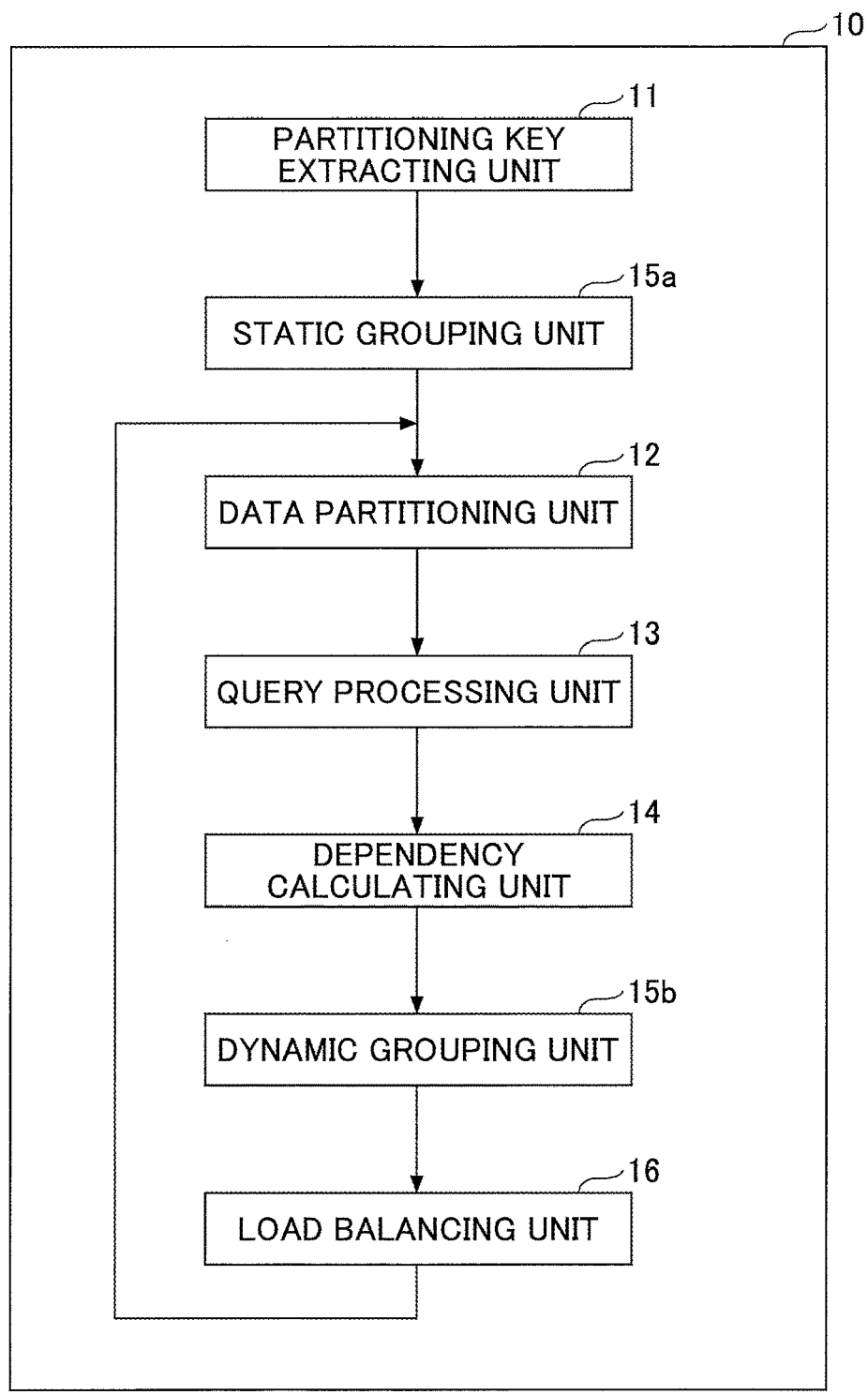
FIG. 24 represents an overview of a functional configuration of the data processing apparatus according to an embodiment of the present invention.
Figure 25:
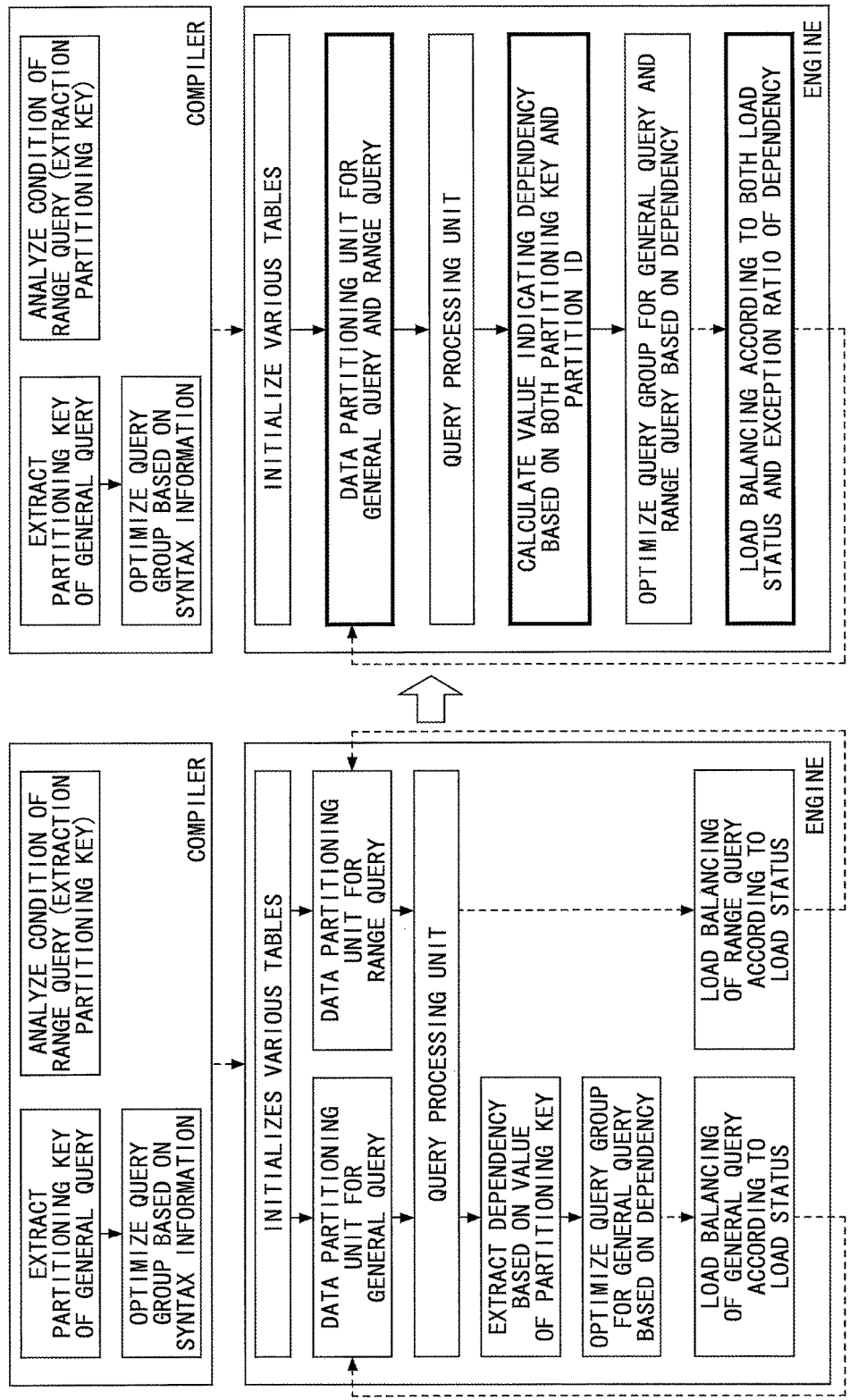
FIG. 25 represents a flow of the process by the data processing apparatus according to an embodiment of the present invention.

First, with reference to FIGS. 24 and 25, an explanation is given of the functional configuration and the flow of the process of a data processing apparatus 10 that executes the data processing method according to the present embodiment. FIG. 24 illustrates a functional configuration of the data processing apparatus 10 according to the present embodiment, and FIG. 25 illustrates a flow of the process by the data processing apparatus 10 according to the present embodiment.

The data processing apparatus 10 according to the present embodiment may be realized by an information processing apparatus such as a server and a PC. The data processing apparatus 10 includes a partitioning key extracting unit 11, a data partitioning unit 12, a query processing unit 13, a dependency calculating unit 14, a static grouping unit 15a, a dynamic grouping unit 15b, and a load balancing unit 16.

The partitioning key extracting unit 11 extracts a partitioning key of a general query. Furthermore, the partitioning key extracting unit 11 analyzes the condition of the range query, and extracts the partitioning key of the range query. The partitioning key of the general query indicates the attribute of the category extracted from the syntax of the general query. The identification value ID of each attribute of the category is an example of a partitioning key of a general query. The partitioning key of the range query indicates the attribute of the area that is divided according to the distribution of coordinates of continuous data within a predetermined section. The identification value PID of each area (partition) divided according to the distribution of coordinates of continuous data within a predetermined period and space (predetermined section) is an example of a partitioning key of a range query.

The data partitioning unit 12 performs a data partitioning process of a general query and a range query. The dependency calculating unit 14 calculates a value (hereinafter, also referred to as a "dependency value") indicating the dependency between a partitioning key of a general query and a partitioning key of a range query.

The static grouping unit 15a groups the general queries based on the syntax of the general queries. The dynamic grouping unit 15b generates query groups by grouping a general query and a range query, based on the calculated dependency value.

The query processing unit 13 performs a load-balancing process for each event of a general query and a range query for each query group. The query processing unit 13 is an example of a load-balancing processing unit for performing a load-balancing process of a first query and a second query for each query group.

An example of an internal process of each event is a counting process of counting the occurrence number of each event illustrated in FIG. 2, which is an example of a process of each event of a general query. Furthermore, an example of a process of each event of a range query, is a counting process of whether there is an accident within four miles in the movement direction in a predetermined range (for example, within five minutes) illustrated in FIG. 10.

The dependency calculating unit 14 calculates a value indicating the strength of the dependency between a partitioning key of a general query and a partitioning key of a range query. Furthermore, the dependency calculating unit 14 performs a load-balancing process for a general query and a range query for each query group, and calculates a predicted value of the maximum throughput.

The load balancing unit 16 performs a load balancing process for a range query and a general query for each query group. Furthermore, the load balancing unit 16 determines whether to execute a load balancing process with respect to a server having high load. For example, when the calculated predicted value of the maximum throughput is a throughput that is less than the present throughput, the load balancing unit 16 avoids performing of a load balancing process of the corresponding range query and general query.

Next, a brief explanation is given of the overview of the flow of a process by the data processing apparatus 10, with reference to FIG. 25. The partitioning key extracting unit 11 extracts a partitioning key of a general query from, for example, an attribute of a group by clause. The static grouping unit 15a optimizes the query group with respect to the general query, based on the syntax of the general query. Furthermore, the partitioning key extracting unit 11 performs condition analysis of the range query, and extracts a partitioning key of the range query. These processes are static processes that are performed by a compiler. Next, an explanation is given of a dynamic process executed by the engine of the data processing apparatus 10.

The engine of the data processing apparatus 10 sequentially performs subsequent processes, after various tables are initialized. First, the data partitioning unit 12 performs a data partitioning process of the general query and the range query. Next, the query processing unit 13 performs an internal process (balancing process) of each event of the general query and the range query for each query group. Next, the dependency calculating unit 14 calculates a value indicating the strength of the dependency between a partitioning key (ID) used in a general query and a partition ID (PID) used in the partitioning key of the range query.

Next, the dynamic grouping unit 15b generates a query group by grouping the general query and the range query, based on the calculated strength value of the dependency. At this time, the dynamic grouping unit 15b groups together a plurality of query groups including a combination of a general query and a range query. At the time of grouping the queries, the optimum query group configuration for the general query and the range query is selected from multiple candidates of query group configurations formed by a combination of a general query and a range query.

Next, the load balancing unit 16 performs a load balancing process of the general query and the range query, for each query group. At this time, the load balancing unit 16 determines whether to execute a load balancing process of the general query and the range query for each query group, based on the maximum throughput predicted based on both the load status and the exception ratio of the dependency.
[Various Data]

Next, an explanation is given on various data used in the data processing method according to the present embodiment. (Combination counter table)

FIGS. 26A and 26B illustrate combination counter tables used for calculating the exception ratio of a dependency when executing a data partitioning process. FIG. 26A represents a combination counter table for managing counters of combinations of partitioning keys. FIG. 26B represents a combination counter table for making a change to manage counters of combinations of partitioning keys and partition IDs according to the present embodiment. In the present embodiment, a partition ID (PID (X)) is applied to the partitioning key X of K2.
[Partition Table]

The result of performing load balancing is applied to the partition table. FIG. 27B represents an example of a partition table for range queries according to the present embodiment. In the case of a range query, the data of each area belongs to one partition, and the area is defined in the fields of range start and range end. When an area having a high load of data is divided into a plurality of areas for the purpose of load balancing, the partition in the table is also divided into two. In count, the number of events belonging to each partition is recorded. Each area has a partition ID (PID) for identifying its partition. In the present embodiment, a server is assigned to each partition in a one-on-one manner. In the partition table, the server load of each server identified by a server ID is indicated. In the case of a range query, when there is data present at coordinates near the boundary between areas, the range query crosses over two or more areas, and communication between servers occurs in this case.

The partition table according to the present embodiment in FIG. 27B is created by adding, to the partition table of the range query illustrated in FIG. 27A, a field of an exception ratio of the dependency (example: ID→X) used for creating the query table. In the added field of an exception ratio of the dependency, an exception ratio calculated by using the partition ID (PID (X)) is recorded.
[Dependency Table]

The dependency table according to the present embodiment illustrated in FIG. 28B is created by adding, to the table of FIG. 28A, a flag field of a flag for clearly indicating that a partitioning key is correctly set and that PID (X) is to be used for partitioning instead of using X, at the time of executing a data partitioning process. When the flag indicating whether to apply PID to K2, has a value of 0, it means that PID is not to be applied to K2. When the value of the flag is 1, it means to apply PID to K2.
[Partitioning Key Table]

The partitioning key table according to the present embodiment illustrated in FIG. 29B is created by adding, to FIG. 29A, a flag (range flag) indicating whether to perform range partitioning such that the key partitioning and the range partitioning may be correctly divided. When the value of the range flag is "0", key partitioning is performed. When the value of the range flag is "1", range partitioning is performed.

[Dependency Value Calculation Process]

Figure 30:
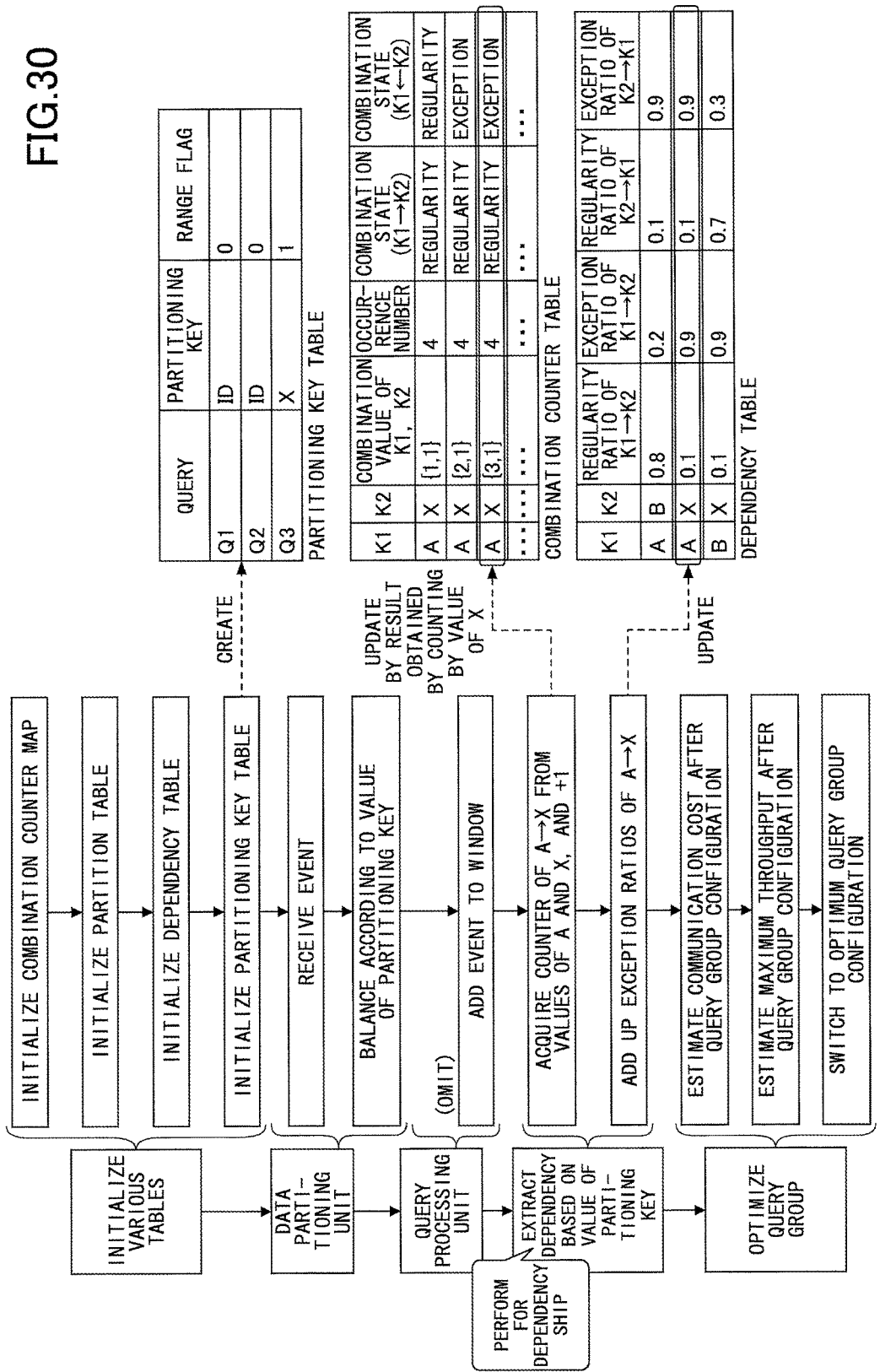
FIG. 30 represents the process of a method of a comparison example for calculating the strength value of a dependency.
Figure 31:
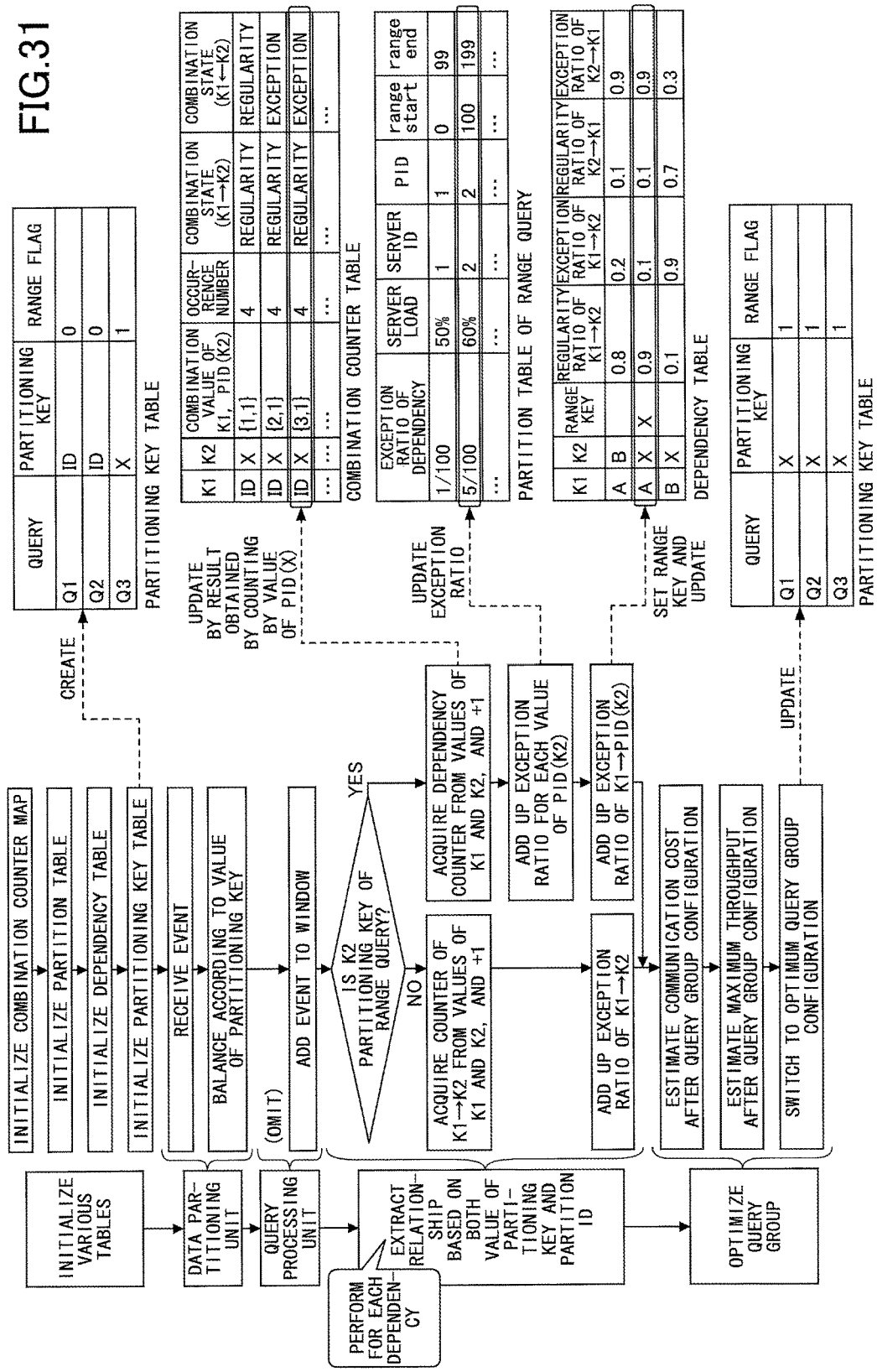
FIG. 31 represents a dependency strength value calculation process according to an embodiment of the present invention.

Next, an explanation is given of a method of calculating a dependency value, in the data processing method according to the present embodiment, with reference to FIG. 31. FIG. 31 represents a dependency strength value calculation process according to an embodiment of the present invention. As a comparison example, FIG. 30 represents the process of a method for calculating the strength value of a dependency.

In the dependency value calculation process according to the method of the comparison example described in FIG. 30, the exception ratios of the dependencies between the partitioning keys A, B and the coordinate X of the data are calculated. Because the granularity of partitioning of coordinate X is small, the dependencies between A and X, B and X are not found, and as illustrated in the dependency table, the exception ratio is high when grouping is performed by A→x and grouping is performed by B→x.

Meanwhile, in the dependency value calculation process according to the present embodiment illustrated in FIG. 31, the exception ratio of the dependency between the partitioning keys A, B and the partition ID (PID (X)) including the coordinate X of the data, is calculated as follows.

From an event transferred to the respective partitions, reference is made to the values of partitioning keys A, B, and the counter of the couple including the referred value and the transferred partition ID is incremented. The values of exception ratios are added up for each partition ID, and finally all of the exception ratios are added up. Then, the exception ratios added up for each partition ID are applied to the partition table.

The granularity of partitioning of the partition IDs is larger than the granularity of partitioning of the coordinates X. Therefore, it is possible to find the dependency between A and PID (X) and the dependency between B and PID (X). As indicated in the dependency table, the exception ratio when grouping is performed by A→PID (X) and grouping is performed by B→PID (X) is lower than the exception ratio when grouping is performed by A→x and grouping is performed by B→x.

[Query Group Optimization]

Figure 32:
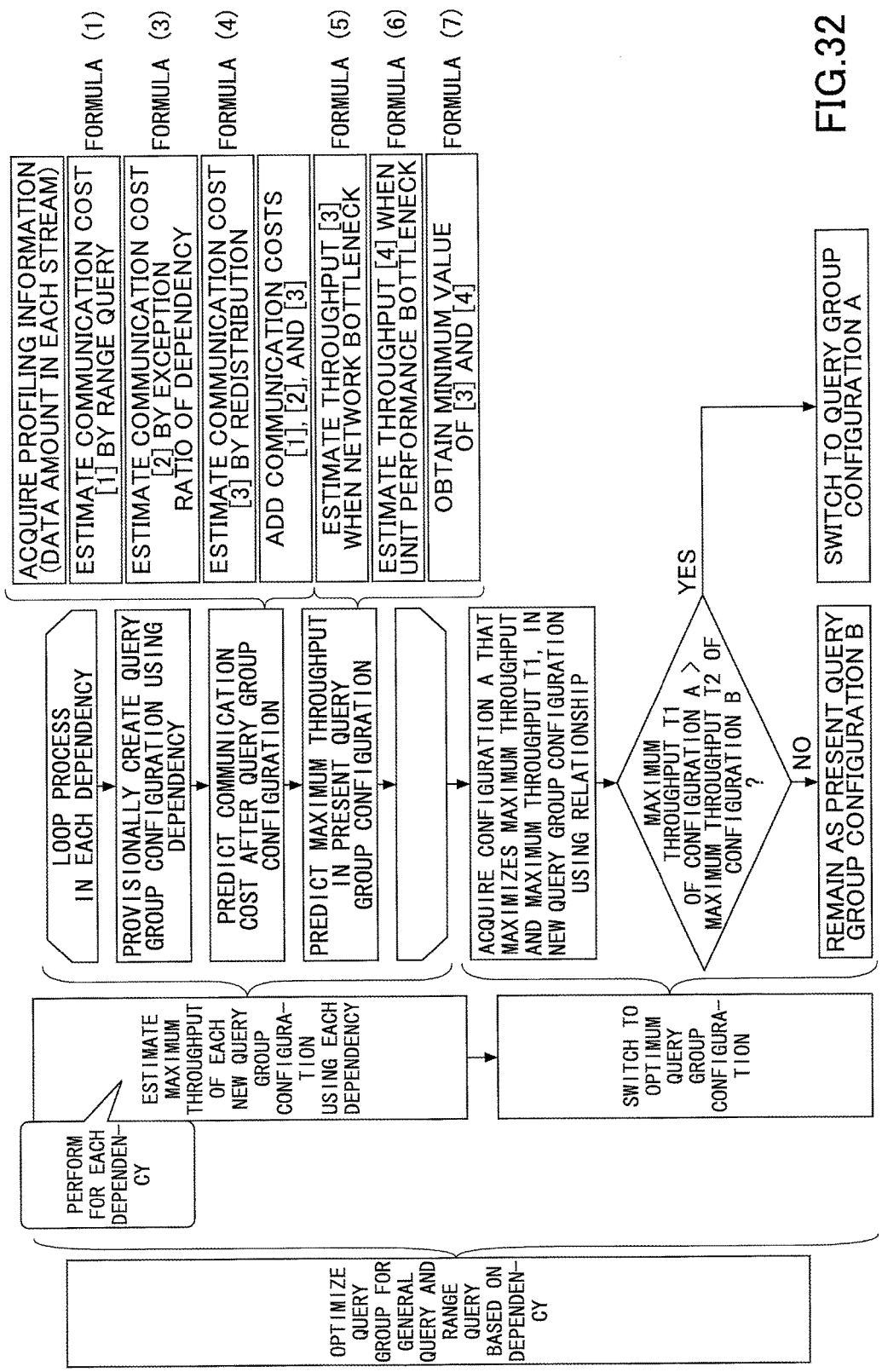
FIG. 32 represents an example of query group optimization according to an embodiment of the present invention.

Next, an explanation is given on query group optimization for a general query and a range query based on the dependency, with reference to FIG. 32. The communication cost [1] by a range query in one direction (for example, the direction indicated by an arrow of the object (vehicle) in FIG. 16), is calculated by, for example by the following formula (1), where L is the search width of the range query, G is the granularity of partitioning, and V is the input data volume (items/S) of the range query.

$$\text{communication cost [1]} = (L/G) \times V \quad (1)$$

The communication cost [1] by a range query of two directions is calculated by the following formula (2).

$$\text{communication cost [1]} = 2 \times (L/G) \times V \quad (2)$$

Formula (1) and formula (2) are based on the formula of the communication cost indicated in FIG. 16. It is known that the smaller the granularity of partitioning G, the larger the communication cost. In the above formula (1) and formula (2), when the data partitioning within the search width is even, it is possible to calculate an accurate communication cost. When the data partitioning within the search width is uneven, the communication cost may be calculated by another formula in consideration of the load-balancing.

When a query group is created and applied based on the dependency, the communication cost [2] according to the exception ratio of the dependency may be calculated by the exception ratio E and an input data volume V in a stream where the dependency is used, as indicated in formula (3).

$$\text{communication cost [2]} = E \times V \quad (3)$$

The maximum throughput after creating a query group configuration based on the dependency according to the result obtained by adding the above two communication costs, may be calculated by the following performance information.

Bandwidth C of network (items/s)
Unit performance p per server (items/s)
(in a case where all queries are operating in servers of all nodes according to the data partitioning method, i.e., assuming that query partitioning is not performed)
Number of servers N
Exception ratio E of dependencies (%)
Data volume Vi in each stream (items/s)

Examples of the data volume Vi (items/s) of each stream are the data volume of the input stream (input data volume) $V_1$, the data volume of the intermediate stream (intermediate data volume) $V_2$, $V_3$, and the data volume of the output stream (output data volume) $V_4$.

The calculation of the communication cost according to re-balancing is performed by dividing the data volume (V) in the stream by "number of servers−1".

$$\text{communication cost [3]} = V/(N-1) \quad (4)$$

The re-balancing is performed when an exception ratio that is greater than or equal to a predetermined value with respect to the dependency of the group configuration and the group is not optimum.

The maximum throughput is determined by the data volume of the input stream when a bottleneck of performance has occurred, and therefore the maximum throughput may be calculated by predicting the condition by which a bottleneck occurs. A performance bottleneck occurs when the input data volume exceeds the unit performance of each server, and when the overall communication cost exceeds the bandwidth of the network. Therefore, the minimum value among the obtained input data volumes that causes these two conditions, is the predicted value of the maximum throughput. For example, in the case of the program and the performance information illustrated in FIG. 21, when the input data volume $V_1$ is obtained by the following formula (7), the maximum throughput is known.

Here, the input data volume $V_1'$ is calculated by the following formula (5), where the input volume indicating the predicted value of the bottleneck of the network is indicated by $V_1'$, and the input data volume indicating the predicted value of the bottleneck of the unit performance of the N number of servers is $V_1''$. Furthermore, the input data volume $V_1''$ is calculated by the following formula (6).

$$V_1' + V_3 \times E + V_4 = C,$$

that is to say, $$V_1' = C - V_3 \times E - V_4 \quad (5)$$

(predicted value of network bottleneck)

$$V_1'' = p \times N \quad (6)$$

(predicted value of unit performance bottleneck)
input data volume $$V_1 = \min(V_1', V_1'') \quad (7)$$

(minimum value)

In FIG. 32, a query group configuration using the dependencies of the queries is provisionally created, and based on formula (1) through formula (7), the maximum throughput with respect to the query group configuration is predicted. The maximum throughput is predicted with respect to a plurality of query group configurations that are provisionally created (loop process of each dependency in FIG. 32).

For example, among new query group configurations using the dependency, a query group configuration A in which the throughput is maximum, and the maximum throughput T1 of this query group are acquired. When the maximum throughput T1 is larger than the present maximum throughput T2 (throughput of query group configuration B), the query group configuration B is replaced with query group configuration A, and in other cases, the present query group configuration B remains unchanged.

That is to say, the bottleneck of the network and the bottleneck of the server load are respectively obtained, the respective maximum throughputs are calculated, and when the maximum throughput will decrease from the present maximum throughput, the present query group configuration remains unchanged.

Figure 33:
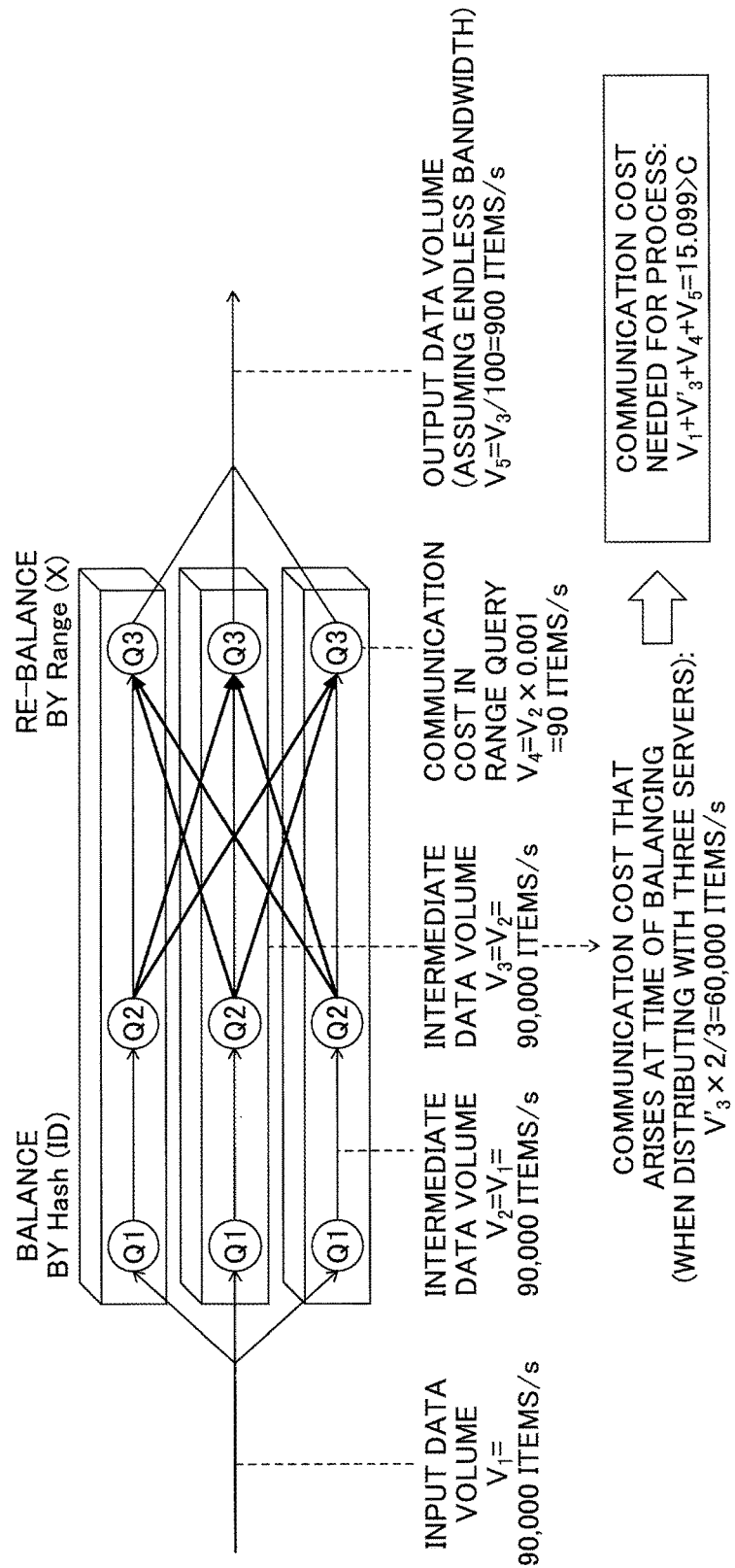
FIG. 33 represents an example of calculating the maximum throughput when using the method of the comparison example represented in FIG. 30.
Figure 34:
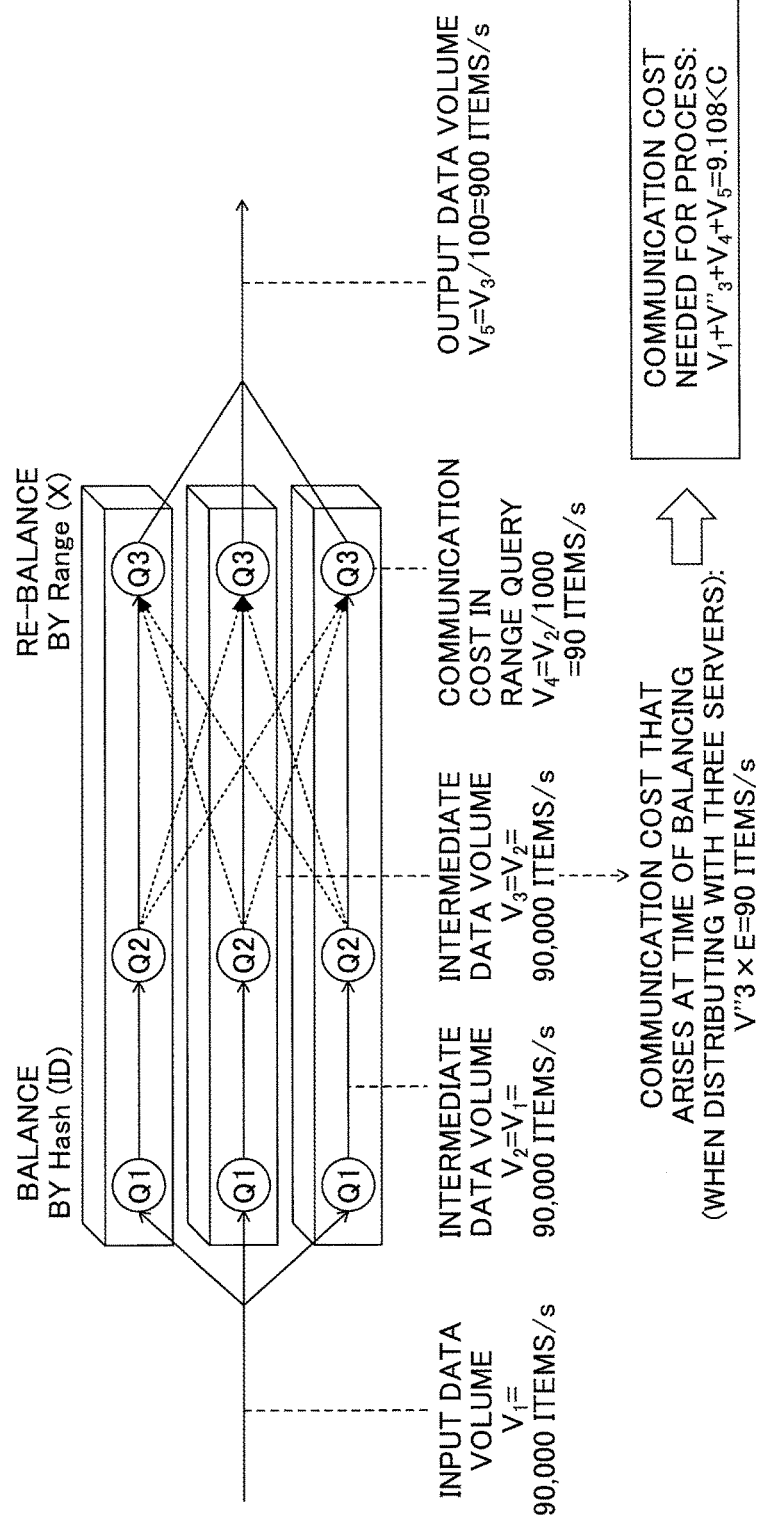
FIG. 34 represents an example of calculating the maximum throughput according to an embodiment of the present invention.

For example, FIG. 33 illustrates an example of prediction by calculating the maximum throughput in the case where the partitioning key of the range query is set as the coordinate X of the data. FIG. 34 illustrates an example of calculating the maximum throughput according to the present embodiment, that is to say, an example of prediction by calculating the maximum throughput in a case where the partitioning key of the range query is set as the partition ID (PID (X)), and an explanation is given by comparing with FIG. 33. Here, the values used for calculation are as follows.

Bandwidth of network C=100,000 items/s
Number of servers: 3 servers
Unit performance per server p=40,000 items/s (Overall performance P=120,000 items/s)
Ideal performance min (P,C)=100,000 items/s
Input data volume $V_1$=90,000 items/s
Intermediate data volume $V_2$=$V_3$=$V_1$=90,000 items/s
Communication cost in range query $V_4$=$V_2$/1000=90 items/s
Output data volume $V_5$=$V_3$/100=900 items/s In FIGS. 33 and 34, Q1 and Q2 are general queries, and Q3 is a range query. With the method of the comparison example, as presented in FIG. 33, when three servers are used to perform a load-balancing process on the data, the probability that data communication occurs between servers is 2/3.

Accordingly, the communication cost at the time of data partitioning to the range query Q3 becomes $V_3'\times 2/3$=60,000 items/s.

Accordingly, the communication cost needed for the data process becomes $V_1+V_3'+V_4+V_5$=15.099>C, and the communication cost exceeds the bandwidth of the network C, and therefore a bottleneck of the network occurs.

The maximum throughput according to the upper limit of the bandwidth of the network is calculated as follows.

communication cost $V_1+V_3'+V_4+V_5=C$ $V_3'=V_1\times 2/3, V_4=V_1/1000, V_5=V_1/100$ By solving the above, the following is obtained.

$V_1=C\times 3000/5033$=59,600 items/s

That is to say, when the bandwidth of the network is C=100,000 items/s, the processable amount of input data is calculated to be 59,600 items/s. Furthermore, the output data volume at this time is $V_5$=5.96/100=596 items/s.

Meanwhile, in the case of the data partitioning process according to the present embodiment illustrated in FIG. 34, the maximum throughput is predicted based on the unit performance of the server and the exception ratio of the dependency. The communication cost that arises when load-balancing data to the range query !3 is $V_3''=V_3\times E$(exception ratio=0.1%)=90 items/s.

Thus, the communication cost needed for data processing according to the present embodiment becomes $V_1+V_3''+V_4+V_5$=9.108<C, which is a communication cost within the bandwidth C of the network. The maximum throughput at this time is calculated as follows.

communication cost $V_1+V_3''+V_4+V_5=C$ $V_3''=V_1\times 2/1000, V_4=V_1/1000, V_5=V_1/100$ By solving the above, the following is obtained.

$V_1=C\times 1000/1012$=98,800 items/s

That is to say, when the bandwidth of the network is C=100,000 items/s, the processable volume of input data is calculated to be 98,800 items/s. Furthermore, the output data volume at this time is $V_5$=5.96/100=988 items/s.

According to the above, in the present embodiment, the maximum throughput when the partitioning key of the range query is set to the partition ID (PID (X)), the maximum throughput is predicted to be significantly higher compared to the maximum throughput when the partitioning key of the range query is set to the coordinate X of data.

[Specific Method of Calculating Exception Ratio]

The exception ratio when load balancing is performed on the data may be predicated by calculation based on the present exception ratio. For example, when the range width of the partition is halved, the load of the server is halved, but the exception ratio is multiplied by two. In the following, an explanation is given of a data partitioning process (FIG. 35), a process of balancing the load of a range query (FIG. 37), calculation of an exception ratio (FIG. 38), and reduction of an exception ratio (FIG. 39).

Figure 35:
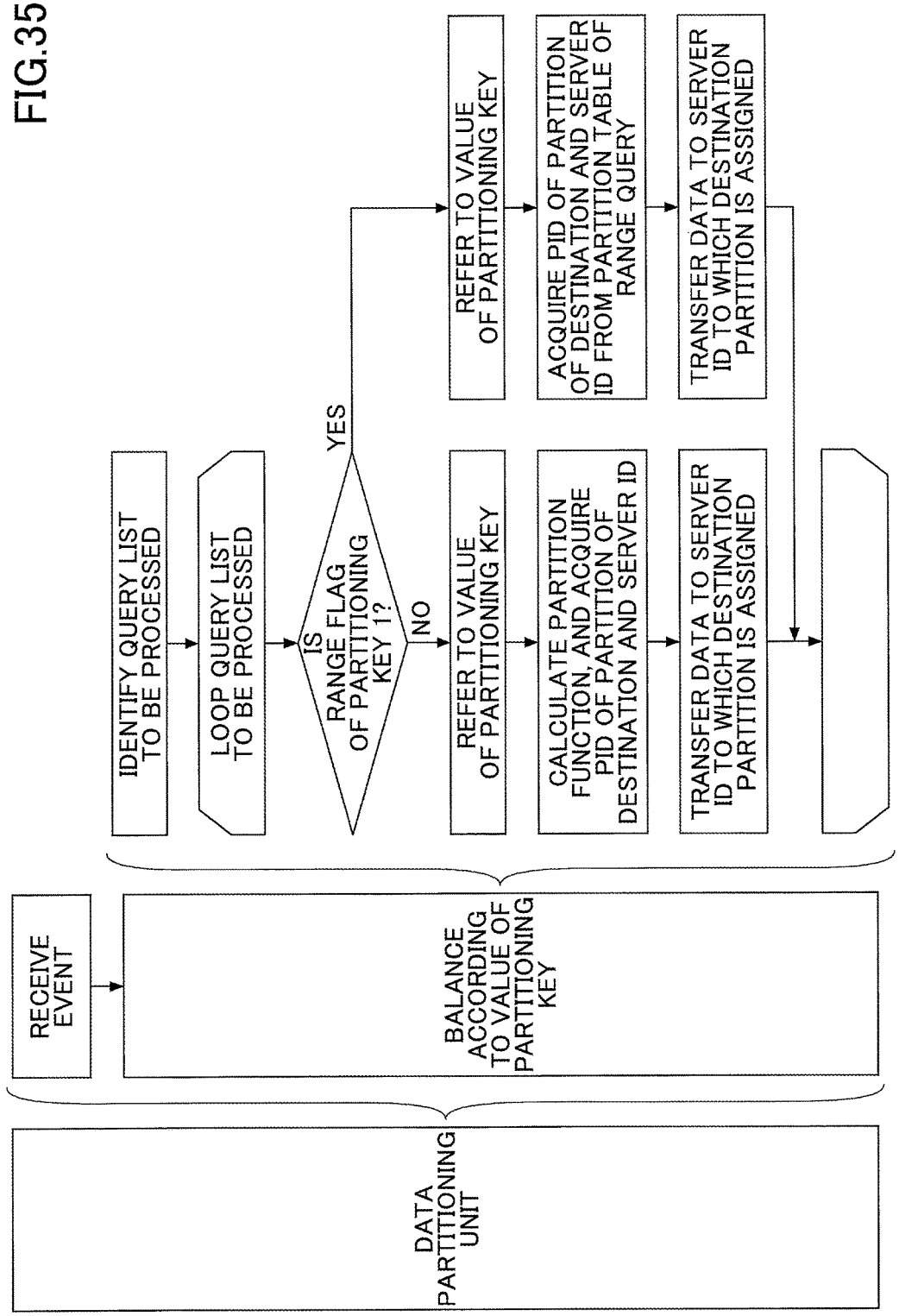
FIG. 35 represents an example of a data partitioning process according to an embodiment of the present invention.

FIG. 35 illustrates an example of a data partitioning process executed by the data partitioning unit 12. In the data partitioning process, in order to partition the data of an input stream, it is confirmed whether the query is a range query from the information of the partitioning key of each query to be processed, and a data partitioning method that matches the characteristic of the query is applied. When the range flag of the partitioning key of the partitioning key table illustrated in FIG. 29B is 1, the data partitioning unit 12 determines that the query is a range query. In this case, the partition that is the destination and the server assigned to the partition are identified from the value of the partitioning key and the partition table illustrated in FIG. 27B, and the data is transferred to the identified server. When the query is not a range query, the partition (PID) that is the destination is identified by applying the partition function to the value of the partitioning key. The server that is the destination is identified by using the PID and the partition table, and the data is transferred to the identified server.

Figure 36:
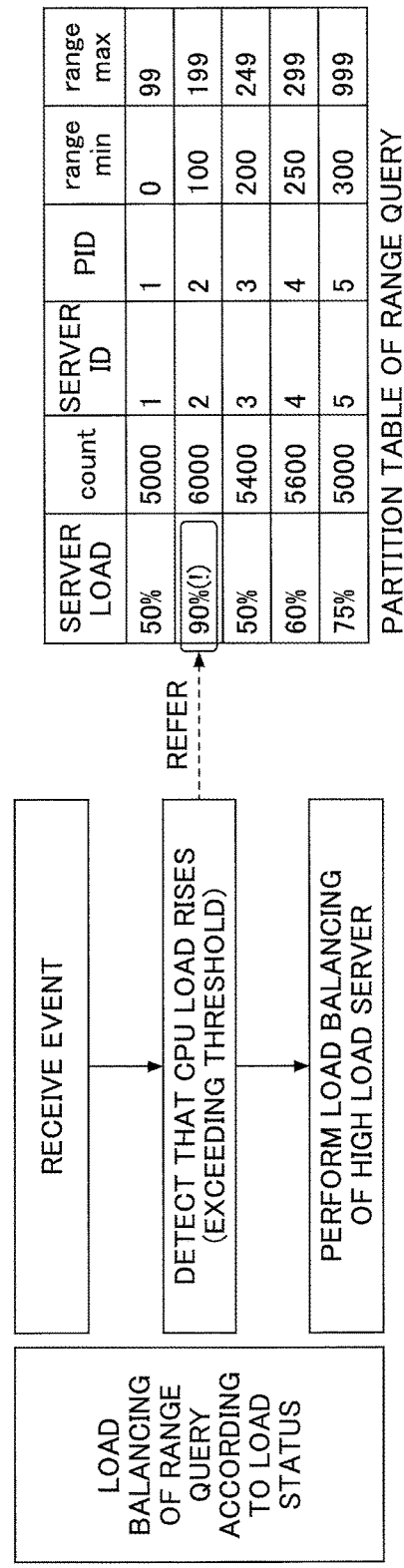
FIG. 36 represents an example of a load balancing process of a range query according to the method of the comparison example represented in FIG. 30.
Figure 37:
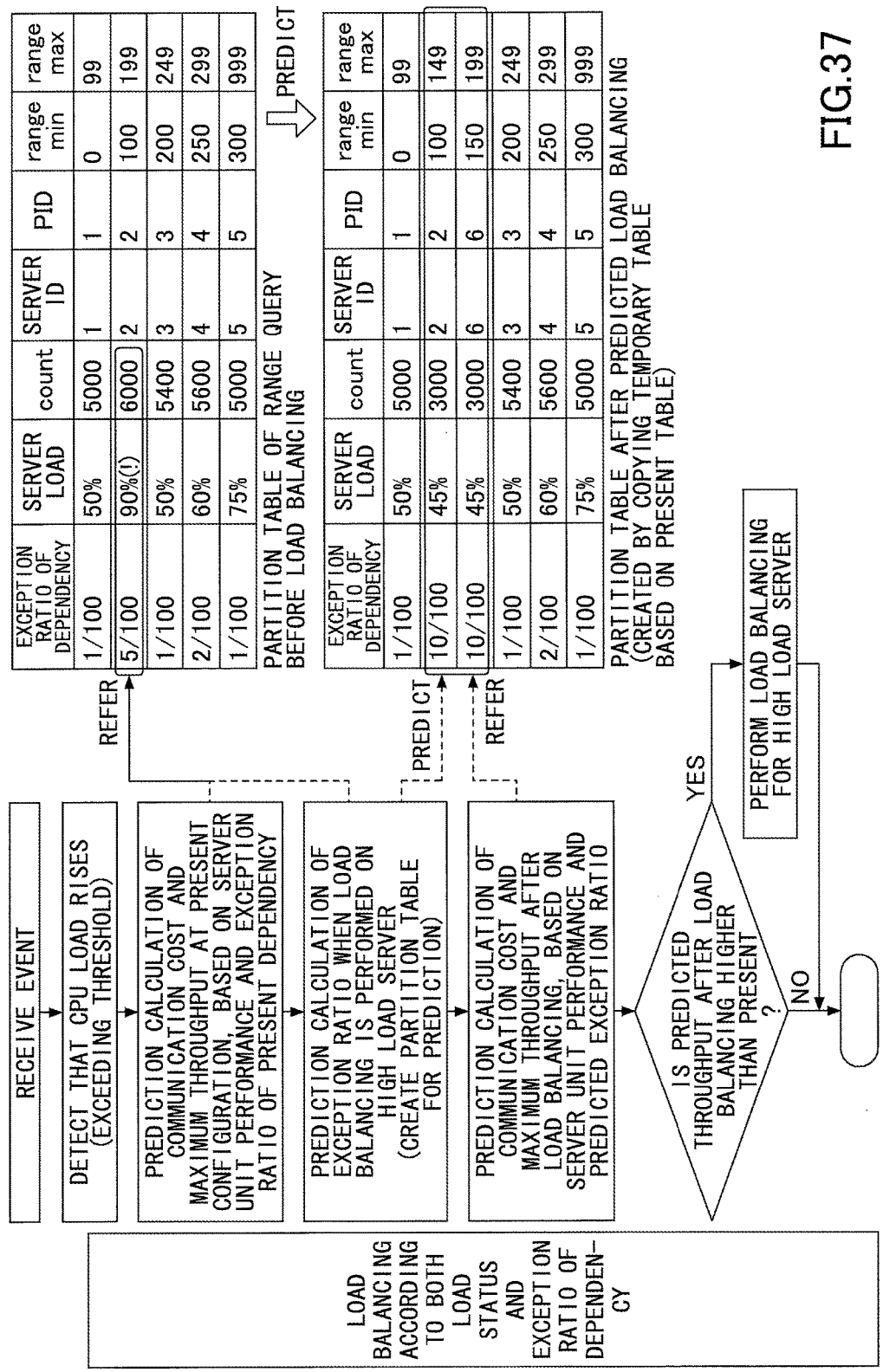
FIG. 37 represents an example of a load balancing process of a range query according to an embodiment of the present invention.

FIG. 36 represents an example of a load balancing process of a range query according to the method of the comparison example represented in FIG. 30, and FIG. 37 illustrates an example of a process of balancing the load of the range query executed by the load balancing unit 16. In the present embodiment, load balancing is executed according to both the load status and the exception ratio of the dependency.

In the method of the comparison example of FIG. 36, when the load of a certain server exceeds a particular threshold, a server is added, and load balancing of the process is executed by the added server. In the present embodiment in FIG. 37, before performing load balancing, the exception ratio according to the dependency after adding a server and performing load balancing is calculated beforehand. Then, based on the unit performance of the server and the predicted exception ratio, the communication cost and the maximum throughput after load balancing are predicted. When the predicted maximum throughput is lower than the present throughput, the load balancing is not performed.

Figure 38:
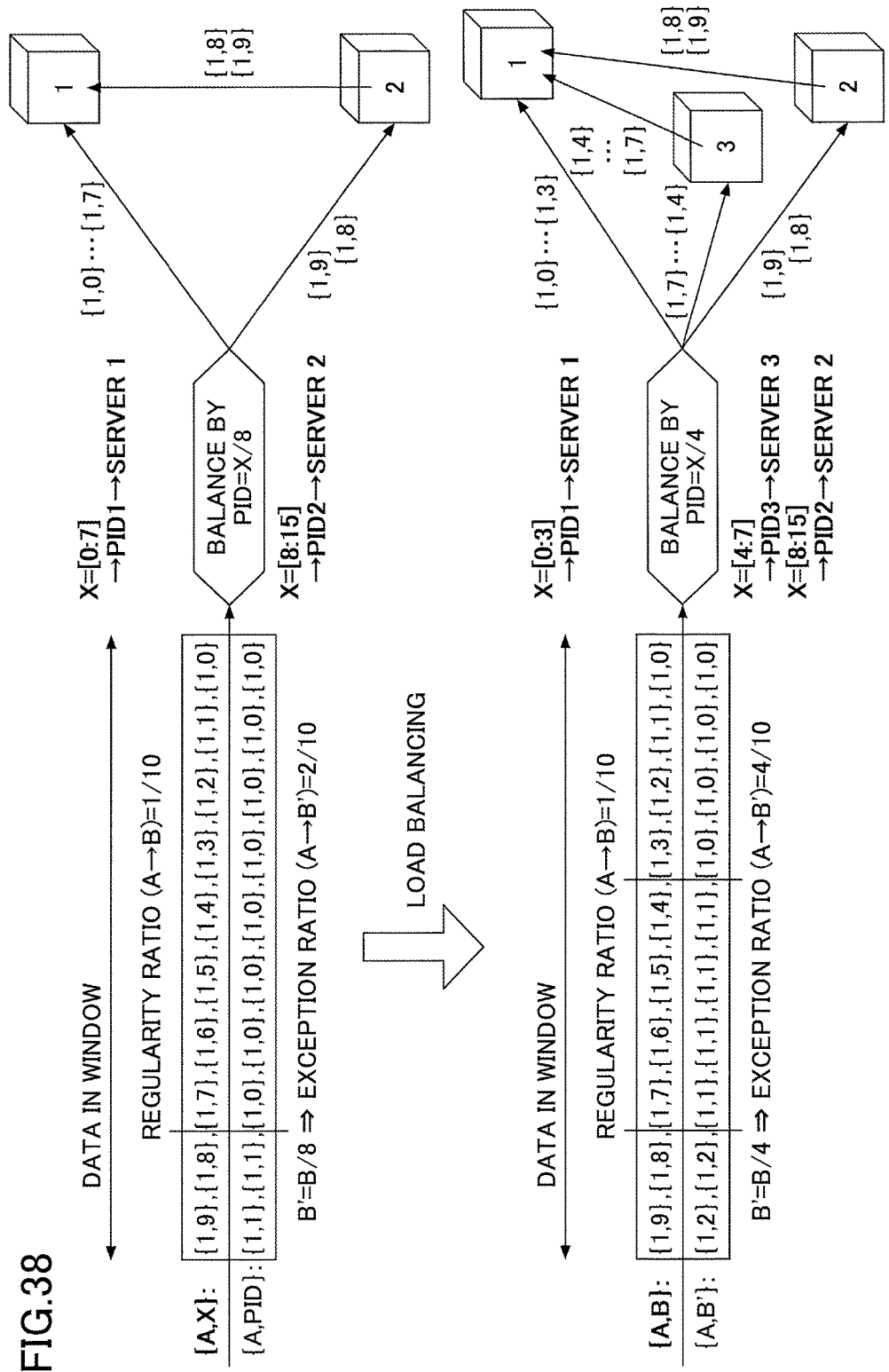
FIG. 38 represents an example of calculating an exception ratio according to an embodiment of the present invention.

In calculating the exception ratio of the dependency, first, as illustrated in the top stage of FIG. 38, a partition in which the load of the server is high is divided into two, as illustrated in the bottom stage of FIG. 38. The data in one half of the divided partitions is assigned to an existing server, and the data in the other half is assigned to a newly added server. By this condition, the exception ratio of the dependency is obtained by a statistical calculation based on the information in the present partition table and the data saved in the partition table. The fields of range min and range max of the new partition are set, such that the data volumes to be included in the two partitions after load-balancing are even, by referring to the load-balancing of the data included in the present range. The server load in each of the two partitions that are newly created, is set to be half the present load. The exception ratio of the dependency is calculated from, for example, the following formula, based on the range width defined from range min and range max:

exception ratio after load-balancing=exception ratio before load-balancing×(range width before load-balancing/range width after load-balancing).

The above calculation formula is based on the following specific estimation. By halving the range width of a single partition, the number of x values corresponding to a single PID is reduced to half, and as a result, the possibility that one value of A corresponds to a same PID in the window becomes half. FIG. 37 illustrates a specific example expressing this phenomenon. By adding a server, the load of 90% of the server becomes a load of 45%. Note that according to the partitioning of the data, the exception ratio after load-balancing may be calculated based on another estimation.

As illustrated in the top stage of FIG. 38, when the data is subjected to load balancing by two servers, the exception ratio of A→B' becomes 2/10. Here, by adding a server, the range width of one partition becomes half, the number of x values corresponding to a single PID becomes half, and as a result, the possibility that one value of A corresponds to the same PID in the window becomes half. As a result, the exception ratio of A→B' becomes 4/10.

[Example of Effect]

Figure 40:
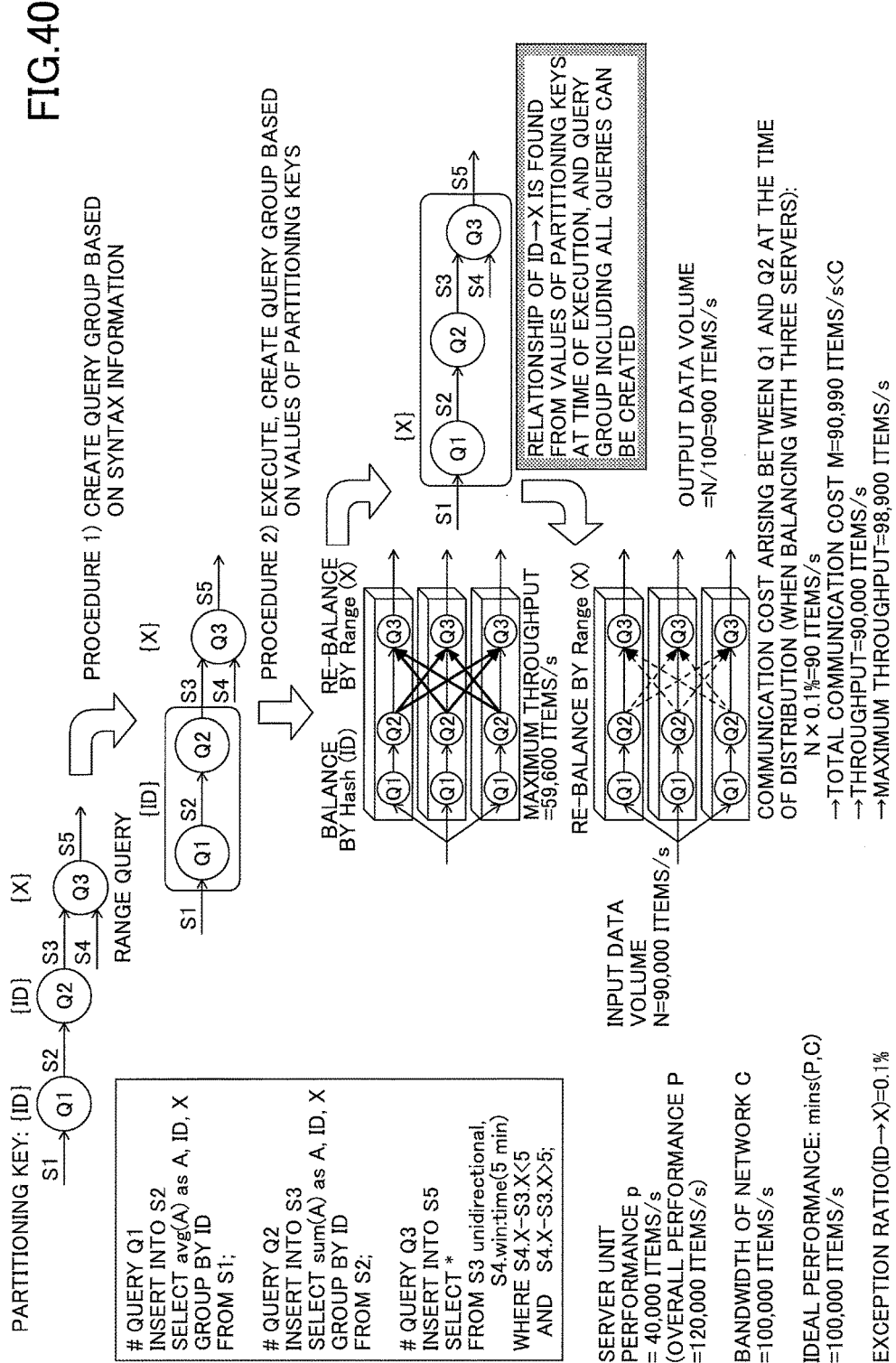
FIG. 40 represents an example of improving the maximum throughput by creating a query group according to an embodiment of the present invention.

Next, an explanation is given of an example of effects of extracting the dependency, based on both a partitioning key of a general query and a partitioning key of a range query (partition ID). FIG. 40 illustrates an example of improving the maximum throughput by creating a query group according to the present embodiment.

As described above, in the data processing method according to the present embodiment, the dependency between a general query and a range query is extracted based on both the partitioning key of a general query and a partition ID that is a partitioning key of a range query. In the present embodiment, as illustrated in FIG. 39, by using a partition ID, the occurrence number is counted for each combination of a partitioning key ID of a general query and a partitioning key PID (x) of a range query. Accordingly, it is possible to reduce the exception ratio of the dependency that is the search target, compared to the exception ratio when the occurrence number is counted for each combination of the partitioning key ID of a general query and a partitioning key x of a range query illustrated in FIG. 23.

As the granularity of partitioning of the range query becomes relatively large, the exception ratio ID→X of the dependency is decreased, and the impact on the maximum throughput is reduced. For example, as illustrated in FIG. 40, assuming that the exception ratio is decreased to 0.1% by a configuration of three servers, the maximum throughput is increased without increasing the communication cost much. When the occurrence number is counted for each combination of the partitioning key ID of a general query and a partitioning key x of a range query, the maximum throughput is decreased down to 59,600 items/x (see FIG. 21). Meanwhile, the maximum throughput of the present embodiment becomes 99,000 items/s, which is close to the hardware performance (100,000 items/s).

In the case of the data partitioning process according to the present embodiment in FIG. 40, the maximum throughput is predicted based on the unit performance of the server and the exception ratio of the dependency. The communication cost that arises when partitioning the data to the range query Q3 becomes $V_3 \times E$ (exception ratio=0.1%)= 90 items/s.

Accordingly, the communication cost needed for data processing according to the present embodiment becomes $V_1+V_3+V_4+V_5=9.108<C$, which is a communication cost within the bandwidth C of the network. The maximum throughput at this time is calculated as follows.

total communication cost=$V_1$(90,000 items/s)+$V_4$(90 items/s)+$V_5$(900 items/s)=90,990 items/s<$C$
maximum throughput=98,900 items/s Modification Example Next, an explanation is given of a data processing method according to a modification example of the present embodiment. There are cases where the communication cost according to exceptions of dependencies is large, and the predicted maximum throughput calculated by formula (7) becomes lower than the maximum throughput of the present configuration of the query group. In this case, it is preferable to leave the present query group configuration unchanged, without creating a new query group by using the dependency.

Figure 41:
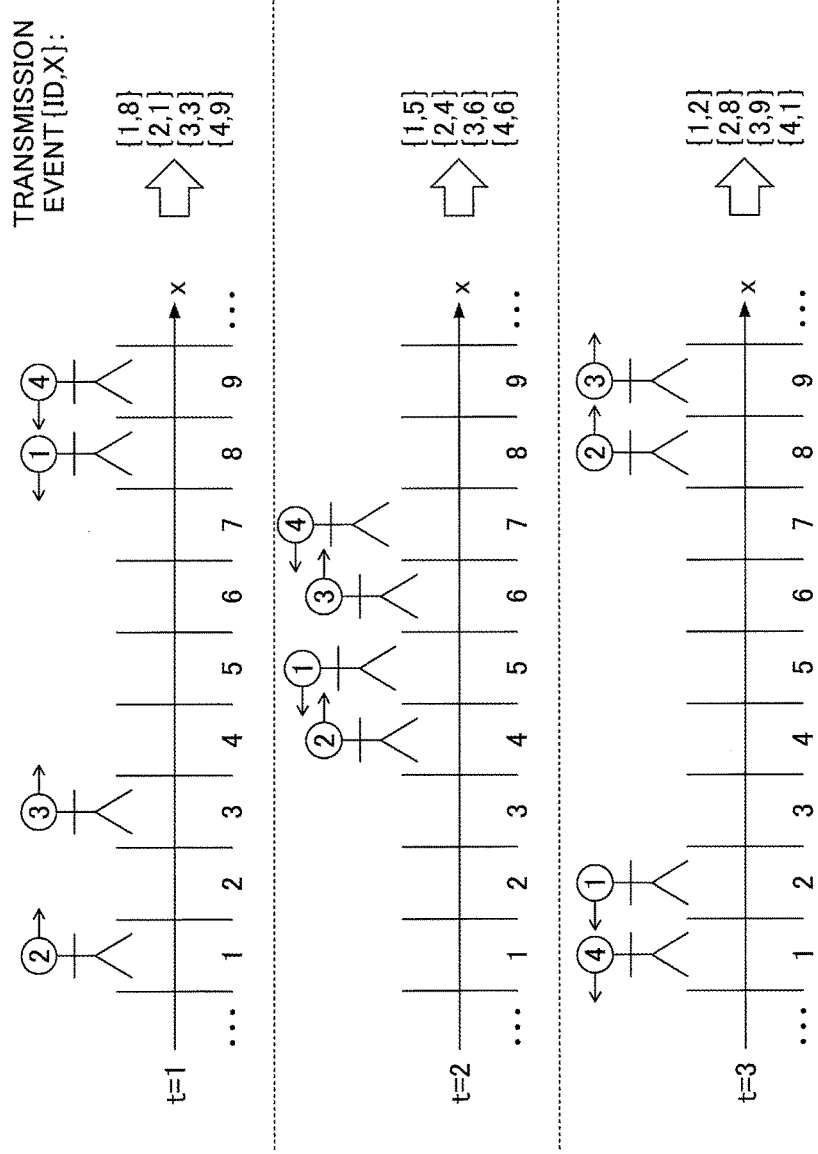
FIG. 41 represents an example of monitored objects moving at high speed.
Figure 42:
FIG. 42 represents how the high-speed moving objects represented in FIG. 41 cause a rise of exception ratio.
Figure 43:
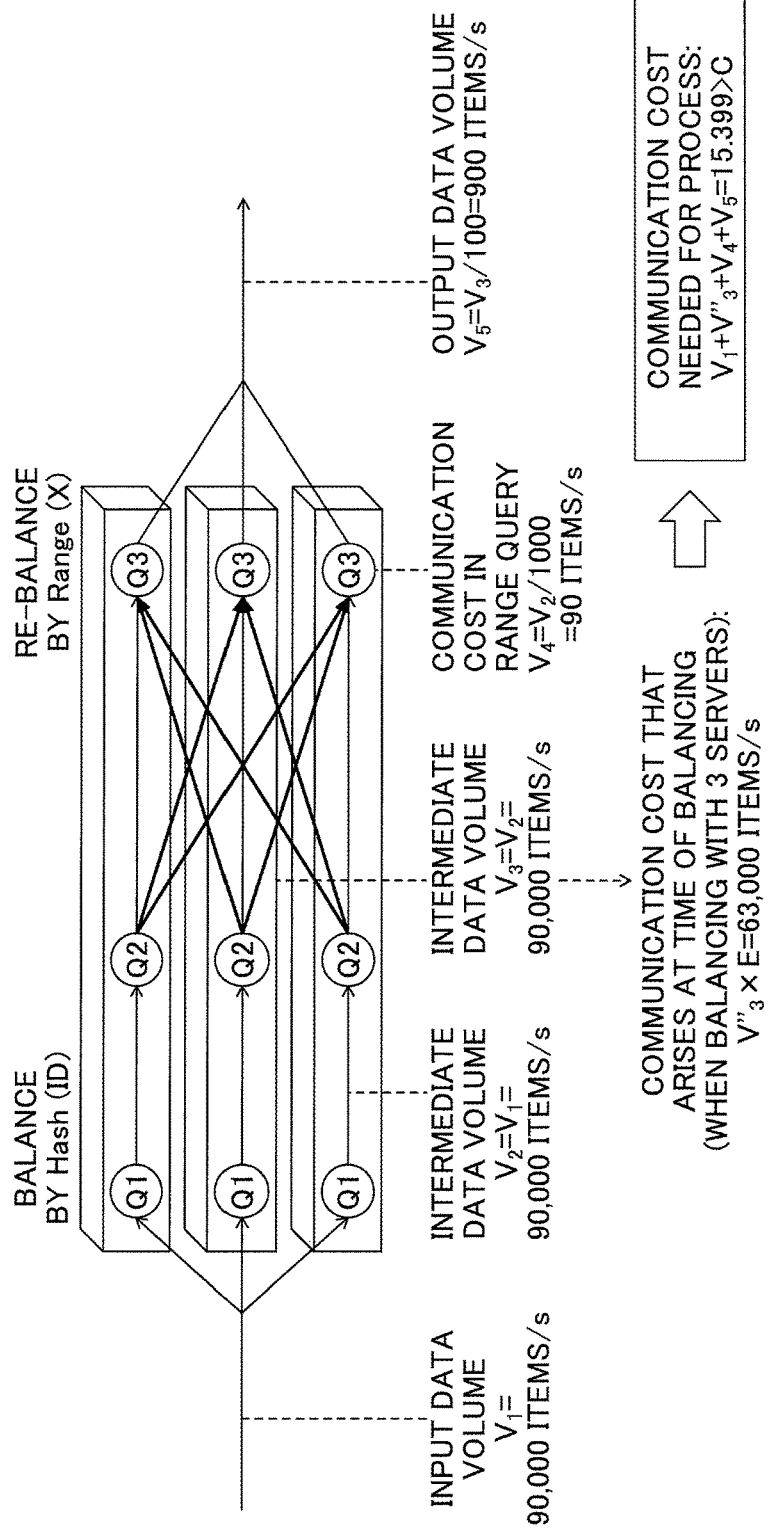
FIG. 43 represents how the rise of exception ratio described in FIG. 42 causes a decrease of the maximum throughput when using the method of the comparison example represented in FIG. 30.

For example, when the target object moves at high speed as illustrated in FIG. 41, the exception ratio of the dependency increases as illustrated in FIG. 42. When the exception ratio of the dependency increases as described above, the communication cost and the maximum throughput are calculated by formula (1) through formula (7).

The communication cost that arises when partitioning the data to the range query Q3 becomes $V_3''=V_3 \times E$(exception ratio=0.7%)=63,000 items/s.

Accordingly, the communication cost needed for data processing according to the present embodiment becomes $V_1+V_3''+V_4+V_5=15.399>C$, which is a communication cost exceeding the bandwidth C of the network, and therefore a bottleneck of the network occurs. The maximum throughput at this time is calculated as follows.

communication cost $V_1+V_3''+V_4+V_5=C$ $V_3''=V_1 \times 0.7, V_4=V_1/1000, V_5=V_1/100$ By solving the above, the following is obtained. maximum processable input data volume $$V_1 = C/(1+0.7+0.001+0.01) = 58,400 \text{ items/s}$$

output data volume $V_5 = V_1/100 = 584$ items/s

That is to say, the predicted maximum throughput becomes 584 items/s, which is less than the maximum throughput 599 items/s of FIG. 31. Thus, in this case, the load balancing unit 16 does not create a query group configuration after load-balancing, based on the new dependency from the present query group configuration, but determines to continue operations by the present query group configuration. Note that the determination process is executed according to the flowchart of FIG. 30.

In the present embodiment, when the range query and the general query are collectively load-balanced in a query group by range(X) as in FIG. 40, as illustrated in FIG. 14A, there is a need for the range width to be appropriately adjusted according to the rise in the server load, and balance the load. In this case, load balancing may be performed by adding a server, by applying the technique as illustrated in FIGS. 14A, 14B. However, the load balancing as described above may increase the exception ratio of the dependency between partitioning keys used for the query group, which may decrease the maximum throughput after load balancing compared to the maximum throughput before load balancing.

Figure 44:
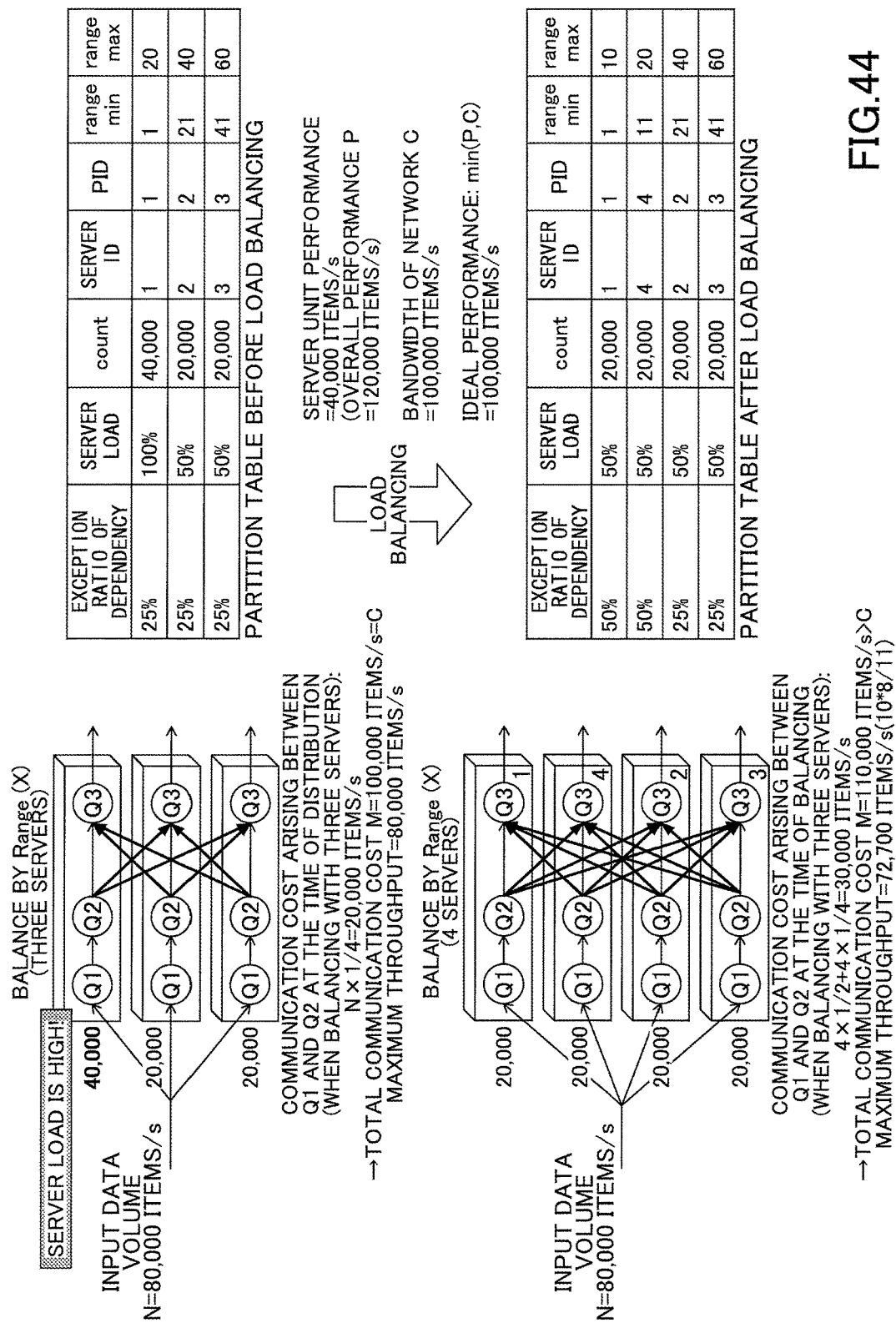
FIG. 44 represents an example of a decrease in the maximum throughput when adding a server for load balancing according to an embodiment of the present invention.

For example, as indicated in the partition table before load balancing illustrated in FIG. 44, it is assumed that the exception ratio of dependency is 25% in all servers, by a configuration of three servers before load balancing. When load balancing is performed for a server 1 having high load, as indicated in the partition table after load balancing, the exception ratio of dependency in the partitions of server 1 and server 4 after load balancing is increased by two times, to 50%.

In the present embodiment and the present modification example, by using the dependency value calculation process of FIG. 30, before actually performing the load balancing, the dependency calculating unit 14 calculates the predicted values of the exception ratio in each partition and the communication cost according to the exception ratio, in a case where load balancing is performed. Accordingly, it is possible to predict the maximum throughput after load balancing. As a result, in the present modification example, when the predicted maximum throughput is lower than the present maximum throughput, it is possible to avoid performing of load balancing.

Figure 45:
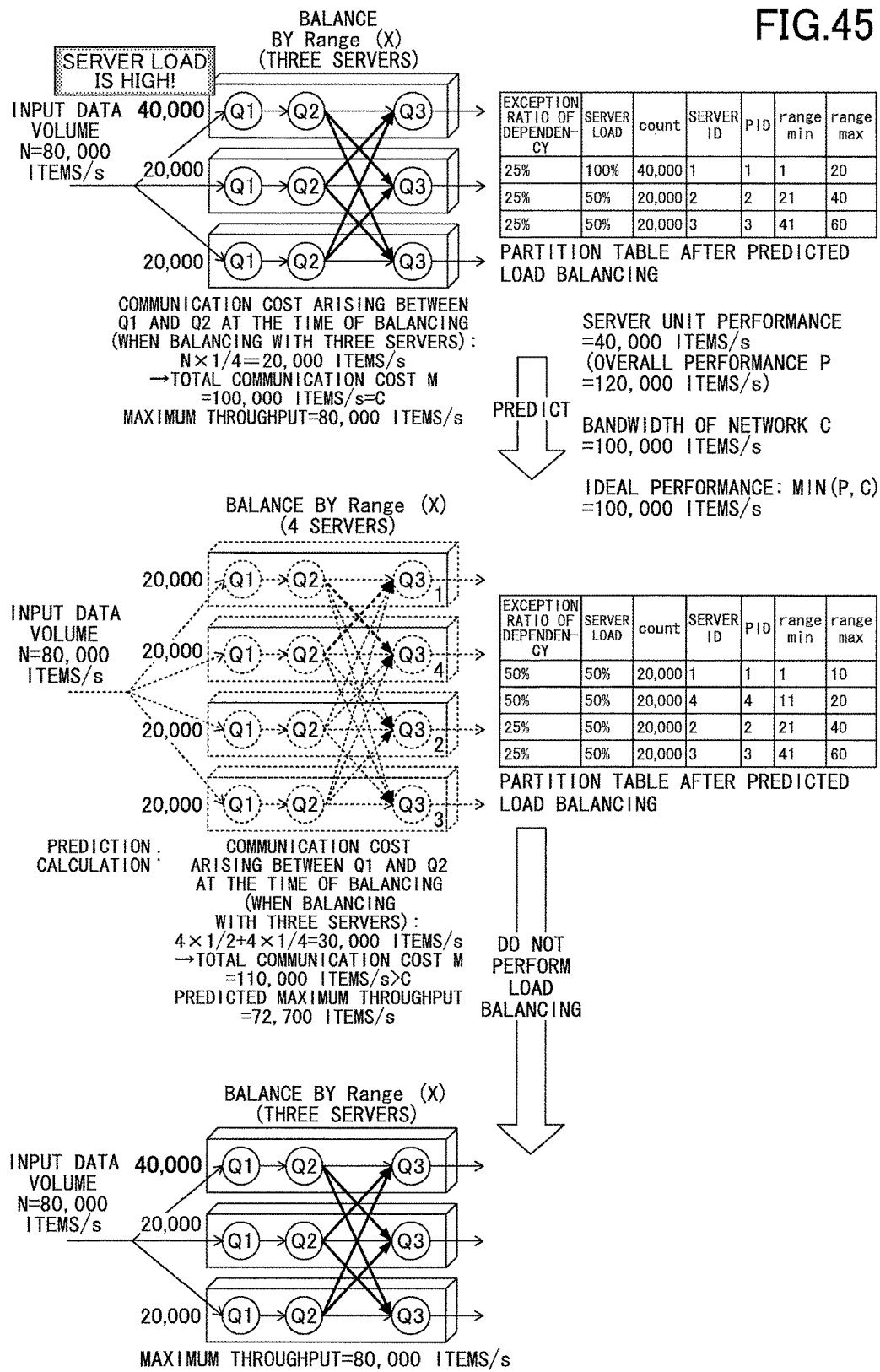
FIG. 45 represents an example of avoiding a decrease in the maximum throughput by estimating in advance the maximal throughput and avoiding adding a server when not beneficial for load balancing according to an embodiment of the present invention.

FIG. 45 illustrates an example of avoiding performing of a load balancing process according to the present modification example. In this example, when a server 4 is added, and the load of the server 1 is balanced across the server 1 and the server 4, the dependency calculating unit 14 predicts that the total communication cost M is 110,000 items/s, and the predicted maximum throughput is 72,700 items/s. This value is less than 80,000 items/s that is the present maximum throughput. Therefore, a load balancing configuration of balancing the process of the server 1 across the server 1 and server 4 is not used, and performing of load balancing is avoided in this example.

As described above, by the data processing method according to the present embodiment and the present modification example, the communication cost between servers when continuously processing a general query and a range query is reduced, and therefore the throughput is increased.

Furthermore, when the exception ratio is increased, the throughput is decreased. Particularly, when the partition ID is small, the exception ratio increases, and the throughput decreases. Therefore, when it is predicted that the exception ratio becomes high and the maximum throughput becomes lower than present, the load balancing by adding a server is not performed, and therefore a decrease in the throughput is suppressed.

[Hardware Configuration]

Figure 46:
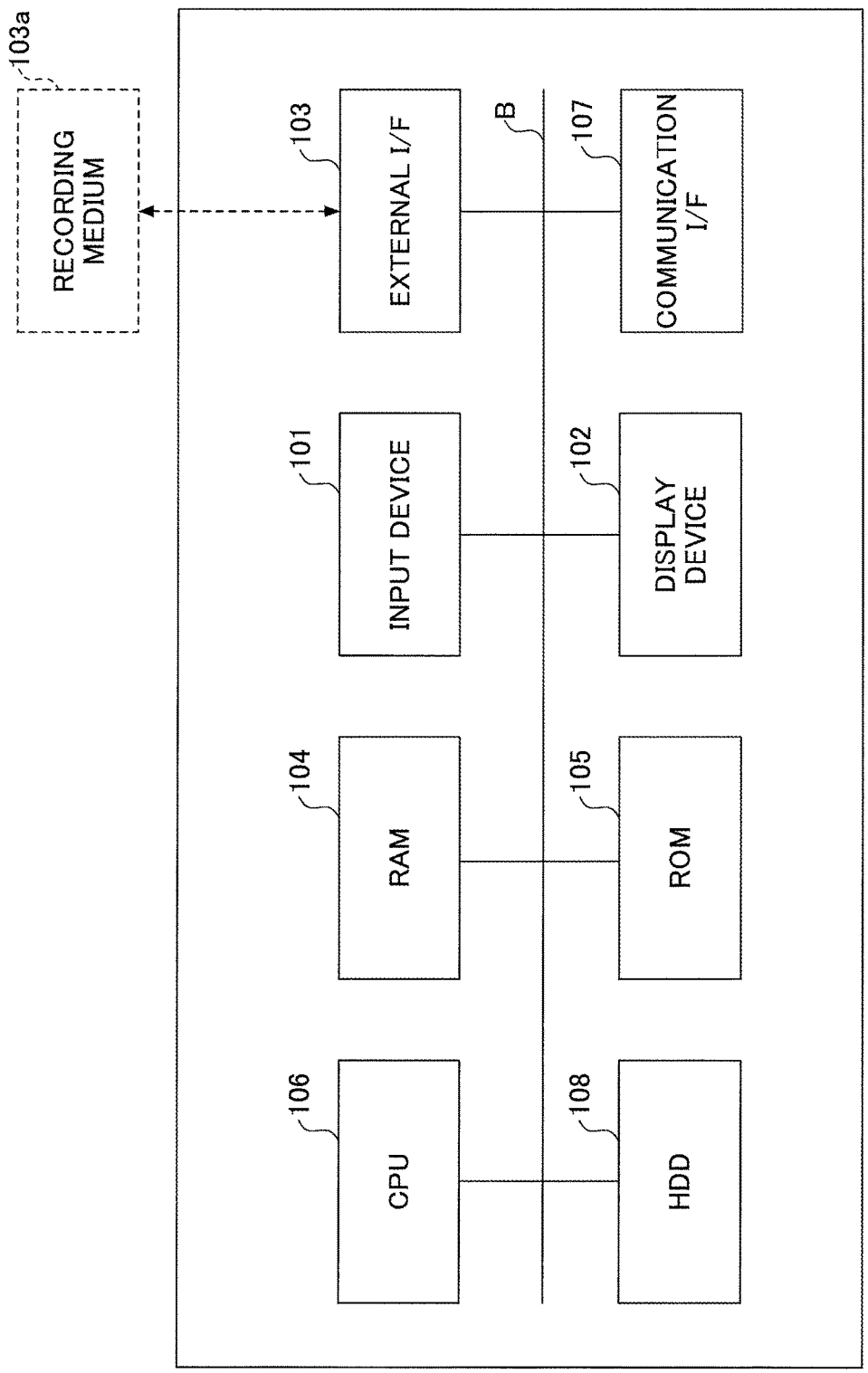
FIG. 46 represents an example of a hardware configuration of the data processing apparatus according to an embodiment of the present invention.

Lastly, an explanation is given of a hardware configuration example of the data processing apparatus 10 according to the present embodiment, with reference to FIG. 46. FIG. 46 is an example of a hardware configuration of the data processing apparatus 10 according to the present embodiment.

The data processing apparatus 10 includes an input device 101, a display device 102, an external I/F 103, a RAM (Random Access Memory) 104, a ROM (Read Only Memory) 105, a CPU (Central Processing Unit) 106, a communication I/F 107, and a HDD (Hard Disk Drive) 108, which are interconnected by a bus B.

The input device 101 includes a keyboard and a mouse, and is used for inputting operation signals in the data processing apparatus 10. The display device 102 includes a display, and displays various processing results.

The communication I/F 107 is an interface for connecting the data processing apparatus 10 to a network, and the data processing apparatus 10 is able to perform data communication with other devices via the communication I/F 107.

The HDD 108 is a non-volatile storage device storing programs and data. The stored programs and data are a basic software for controlling the entire device and application software. For example, the HDD 108 stores various DB information and programs, etc.

The external I/F 103 is an interface between the data processing apparatus 10 and an external device. An example of an external device is a recording medium 130a. Accordingly, the data processing apparatus 10 is able to read and/or write data in the recording medium 130a via the external I/F 103. Examples of the recording medium 130a are a floppy (registered or registered trademark) disk, a CD (Compact Disk), a DVD (Digital Versatile Disk), a SD memory card, and a USB memory (Universal Serial Bus memory).

The ROM 105 is a non-volatile semiconductor memory (storage device) that may store internal data even when the power is turned off. The ROM 105 stores programs and data such as network settings. The RAM 104 is a volatile semiconductor memory (storage device) for temporarily storing programs and data. The CPU 106 is a processor for controlling the overall device and realizing install functions, by loading programs and data from the above storage devices (for example, the HDD 108 and the ROM 105) into the RAM 104, and executing processes.

By the above hardware configuration, the data processing method and the data processing apparatus according to the present embodiment are capable of performing a load-balancing process on stream data. For example, the CPU 106 executes a query process and a process for calculating the maximum throughput by using data and programs stored in the ROM 105 and the HDD 108.

The combination counter tables of FIGS. 26A and 26B, the partition tables of FIGS. 27A and 27B, the dependency tables of FIGS. 28A and 28B, and the partitioning key tables of FIGS. 29A and 29B may be stored in the RAM 104 or the HDD 108, or may be stored in a storage area in a cloud computer.

The data processing method and the data processing apparatus are not limited to the specific embodiments described herein, and variations and modifications may be made without departing from the spirit and scope of the present invention. Furthermore, a plurality of the above embodiments and modification examples may be combined as long as there is no contradiction.

Furthermore, in the above explanation, the partition ID and the server are provided in a one-on-one manner; however, the partition ID and the server need not be provided in a one-on-one manner.

According to an aspect of the embodiments, it is possible to reduce the communication cost and to improve the throughput, when sequentially processing a query for performing a load-balancing process on data without continuation that is combined according each attribute of a category, and a query for performing a load-balancing process on continuous data within a predetermined section.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data processing method executed by a data processing apparatus, the data processing method comprising:

calculating a first value indicating a dependency between a first partitioning key of a first query and a second partitioning key of a second query, the first query being for processing discontinuous data, the second query being for processing continuous data within a predetermined section, the continuous data being presented in a space, the first partitioning key specifying a categorical attribute extracted from syntax of the first query, and the second partitioning key specifying a numerical attribute holding numerical values associated with the second query, the second partitioning key being assigned to each area into which the space is divided such that an equal data volume is applied to each area;

generating a query group made of the first query and the second query based on the first value;

predicting a maximum throughput that will result from performing distributed processing for the first query and the second query based on the query group;

comparing the predicted maximum throughput with a current maximum throughput, the current maximum throughput being a maximum throughput in a case of avoiding performing of the distributed processing of the first query and the second query based on the query group;

performing the distributed processing of the first query and the second query based on the query group to execute the first query and the second query when the predicted maximum throughput is higher than the current maximum throughput; and avoiding performing of the distributed processing of the first query and the second query based on the query group to execute the first query and the second query when the predicted maximum throughput is equal to or lower than the current maximum throughput.

2. A non-transitory computer-readable recording medium storing a data processing program that causes a data processing apparatus to execute a process, the process comprising:

calculating a first value indicating a dependency between a first partitioning key of a first query and a second partitioning key of a second query, the first query being for processing discontinuous data, the second query being for processing continuous data within a predetermined section, the continuous data being presented in a space, the first partitioning key specifying a categorical attribute extracted from syntax of the first query, and the second partitioning key specifying a numerical attribute holding numerical values associated with the second query, the second partitioning key being assigned to each area into which the space is divided such that an equal data volume is applied to each area;

generating a query group made of the first query and the second query based on the first value;

predicting a maximum throughput that will result from performing distributed processing for the first query and the second query based on the query group;

comparing the predicted maximum throughput with a current maximum throughput, the current maximum throughput being a maximum throughput in a case of avoiding performing of the distributed processing of the first query and the second query based on the query group;

performing the distributed processing of the first query and the second query based on the query group to execute the first query and the second query when the predicted maximum throughput is higher than the current maximum throughput; and avoiding performing of the distributed processing of the first query and the second query based on the query group to execute the first query and the second query when the predicted maximum throughput is equal to or lower than the current maximum throughput.

3. A data processing apparatus comprising:

a processor configured to execute a process including calculating a first value indicating a dependency between a first partitioning key of a first query and a second partitioning key of a second query, the first query being for processing discontinuous data, the second query being for processing continuous data within a predetermined section, the continuous data being presented in a space, the first partitioning key specifying a categorical attribute extracted from syntax of the first query, and the second partitioning key specifying a numerical attribute holding numerical values associated with the second query, the second partitioning key being assigned to each area into which the space is divided such that an equal data volume is applied to each area;

generating a query group made of the first query and the second query based on the first value;

predicting a maximum throughput that will result from performing distributed processing for the first query and the second query based on the query group;

comparing the predicted maximum throughput with a current maximum throughput, the current maximum throughput being a maximum throughput in a case of avoiding performing of the distributed processing of the first query and the second query based on the query group;

performing the distributed processing of the first query and the second query based on the query group to execute the first query and the second query when the predicted maximum throughput is higher than the current maximum throughput; and avoiding performing of the distributed processing of the first query and the second query based on the query group to execute the first query and the second query when the predicted maximum throughput is equal to or lower than the current maximum throughput.

\* \* \* \* \*